United States Patent
Connolly et al.

(10) Patent No.: US 9,239,991 B2
(45) Date of Patent: Jan. 19, 2016

(54) SERVICES SUPPORT SYSTEM AND METHOD

(71) Applicant: General Electric Company, Schenectady, NY (US)

(72) Inventors: Paul Connolly, Erie, PA (US); Gina Trombley, Chappaqua, NY (US); Brandi Wood, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/445,099

(22) Filed: Jul. 29, 2014

(65) Prior Publication Data

US 2015/0066286 A1 Mar. 5, 2015

Related U.S. Application Data

(60) Provisional application No. 61/874,178, filed on Sep. 5, 2013.

(51) Int. Cl.
*G01M 17/00* (2006.01)
*G06Q 10/00* (2012.01)

(52) U.S. Cl.
CPC ....................................... *G06Q 10/00* (2013.01)

(58) Field of Classification Search
CPC ......... G06Q 10/20; G07C 5/006; G07C 5/008
See application file for complete search history.

(56) References Cited

U.S. PATENT DOCUMENTS

| | | |
|---|---|---|
| 3,944,986 A | 3/1976 | Staples |
| 4,213,119 A | 7/1980 | Ward et al. |
| 4,404,639 A | 9/1983 | McGuire et al. |
| 4,688,026 A | 8/1987 | Scribner |
| 4,890,102 A | 12/1989 | Oliver |
| 4,899,292 A * | 2/1990 | Montagna et al. ................. 1/1 |
| 4,943,238 A | 7/1990 | Gregorio |
| 5,008,661 A | 4/1991 | Raj |
| 5,032,083 A | 7/1991 | Friedman |
| 5,107,499 A | 4/1992 | Lirov et al. |
| 5,111,391 A | 5/1992 | Fields et al. |

(Continued)

FOREIGN PATENT DOCUMENTS

| | | |
|---|---|---|
| EP | 0970870 A2 | 1/2000 |
| EP | 1081659 A1 | 3/2001 |

(Continued)

OTHER PUBLICATIONS

International Search Report and Written Opinion issued in connection with corresponding PCT Application No. PCT/US2014/054341 dated Dec. 18, 2014.

(Continued)

*Primary Examiner* — Jonathan M Dager
(74) *Attorney, Agent, or Firm* — GE Global Patent Operation; John A. Kramer

(57) ABSTRACT

A system and method for remotely supporting users includes receiving identification information of a potential problem with a remotely located equipment from a user and responding to receiving the identification information by providing a recommended work scope to the user. The recommended work scope includes a recommended series of actions to perform to at least one of repair or replace a component subsystem and an instructional representation for display on a mobile device. The first instructional representation both illustrates the series of actions to perform and includes at least one annotation to represent an alert to the user that is related to the action being illustrated. The first instructional representation includes images, videos, and/or a combination thereof that are displayed on the mobile device to guide the user through the recommended work scope.

17 Claims, 18 Drawing Sheets

(56) References Cited

U.S. PATENT DOCUMENTS

| | | | |
|---|---|---|---|
| 5,147,206 A | 9/1992 | Golenski |
| 5,204,821 A | 4/1993 | Inui et al. |
| 5,216,612 A | 6/1993 | Cornett et al. |
| 5,273,434 A | 12/1993 | Peck |
| 5,280,223 A | 1/1994 | Grabowski |
| 5,373,219 A | 12/1994 | Grabowski |
| 5,470,233 A | 11/1995 | Fruchterman et al. |
| 5,528,248 A | 6/1996 | Steiner et al. |
| 5,548,714 A | 8/1996 | Becker |
| 5,566,291 A | 10/1996 | Boulton et al. |
| 5,623,404 A | 4/1997 | Collins |
| 5,657,233 A | 8/1997 | Cherrington et al. |
| 5,664,110 A | 9/1997 | Green et al. |
| 5,705,818 A | 1/1998 | Kelbel et al. |
| 5,717,595 A | 2/1998 | Cherrington et al. |
| 5,778,381 A | 7/1998 | Sandifer |
| 5,786,998 A | 7/1998 | Neeson et al. |
| 5,825,651 A | 10/1998 | Gupta et al. |
| 5,845,272 A * | 12/1998 | Morjaria ............... B60L 3/00 706/45 |
| 5,860,810 A | 1/1999 | Faul |
| 5,867,801 A | 2/1999 | Denny |
| 5,902,985 A | 5/1999 | Bos |
| 5,903,626 A | 5/1999 | Iglehart |
| 5,913,914 A | 6/1999 | Kemner |
| 5,922,040 A | 7/1999 | Prabhakaran |
| 5,931,877 A | 8/1999 | Smith et al. |
| 5,938,721 A | 8/1999 | Dussell et al. |
| 5,946,521 A | 8/1999 | Budnik et al. |
| 5,961,560 A | 10/1999 | Kemner |
| 5,961,561 A | 10/1999 | Wakefield, II |
| 5,978,717 A | 11/1999 | Ebersohn et al. |
| 6,052,631 A | 4/2000 | Busch et al. |
| 6,067,486 A | 5/2000 | Aragones et al. |
| 6,070,155 A | 5/2000 | Cherrington et al. |
| 6,072,481 A | 6/2000 | Matsushita et al. |
| 6,078,826 A | 6/2000 | Croft et al. |
| 6,115,656 A | 9/2000 | Sudolsky |
| 6,115,691 A | 9/2000 | Ulwick |
| 6,122,575 A | 9/2000 | Schmidt et al. |
| 6,167,333 A | 12/2000 | Gehlot |
| 6,170,742 B1 | 1/2001 | Yacoob |
| 6,182,048 B1 | 1/2001 | Osborn et al. |
| 6,185,540 B1 | 2/2001 | Schreitmueller et al. |
| 6,216,108 B1 | 4/2001 | LeVander |
| 6,219,597 B1 | 4/2001 | Longere |
| 6,240,365 B1 | 5/2001 | Bunn |
| 6,260,048 B1 | 7/2001 | Carpenter et al. |
| 6,263,265 B1 | 7/2001 | Fera |
| 6,263,266 B1 | 7/2001 | Hawthorne |
| 6,263,322 B1 | 7/2001 | Kirkevold et al. |
| 6,266,612 B1 | 7/2001 | Dussell et al. |
| 6,317,060 B1 | 11/2001 | Jones |
| 6,318,056 B1 | 11/2001 | Rauch et al. |
| 6,336,065 B1 | 1/2002 | Gibson et al. |
| 6,338,152 B1 | 1/2002 | Fera et al. |
| 6,343,236 B1 | 1/2002 | Gibson et al. |
| 6,377,928 B1 | 4/2002 | Saxena et al. |
| 6,411,899 B2 | 6/2002 | Dussell et al. |
| 6,415,395 B1 | 7/2002 | Varma et al. |
| 6,437,705 B1 | 8/2002 | Barich et al. |
| 6,446,004 B1 | 9/2002 | Cao et al. |
| 6,446,912 B1 | 9/2002 | Barich et al. |
| 6,453,237 B1 | 9/2002 | Fuchs et al. |
| 6,453,823 B1 | 9/2002 | Barich et al. |
| 6,480,121 B1 | 11/2002 | Reimann |
| 6,480,810 B1 | 11/2002 | Cardella et al. |
| 6,543,007 B1 | 4/2003 | Bliley et al. |
| 6,580,975 B2 | 6/2003 | Lovelace, II et al. |
| 6,621,452 B2 | 9/2003 | Knockeart et al. |
| 6,622,067 B1 | 9/2003 | Lovelace, II et al. |
| 6,633,784 B1 | 10/2003 | Lovelace, II et al. |
| 6,636,771 B1 | 10/2003 | Varma et al. |
| 6,647,356 B2 | 11/2003 | Pierro et al. |
| 6,671,698 B2 | 12/2003 | Pickett et al. |
| 6,708,038 B1 | 3/2004 | Laguer-Diaz et al. |
| 6,738,572 B2 | 5/2004 | Hunter |
| 6,769,162 B1 | 8/2004 | Barich et al. |
| 6,810,406 B2 | 10/2004 | Schlabach et al. |
| 6,850,869 B2 | 2/2005 | Pierro et al. |
| 6,898,517 B1 | 5/2005 | Froeberg |
| 6,947,976 B1 | 9/2005 | Devitt et al. |
| 6,959,235 B1 * | 10/2005 | Abdel-Malek ...... B61L 27/0094 340/988 |
| 6,996,498 B2 | 2/2006 | Pierro et al. |
| 7,051,044 B1 | 5/2006 | Fera et al. |
| 7,100,084 B2 | 8/2006 | Unkle et al. |
| 7,107,038 B2 | 9/2006 | Fitch et al. |
| 7,107,491 B2 | 9/2006 | Graichen et al. |
| 7,171,372 B2 | 1/2007 | Daniel et al. |
| 7,212,828 B2 | 5/2007 | Hind et al |
| 7,400,952 B2 | 7/2008 | Pervaiz |
| 7,574,289 B2 | 8/2009 | Moffett et al. |
| 7,627,546 B2 | 12/2009 | Moser et al. |
| 7,776,505 B2 | 8/2010 | Gonsalves |
| 7,805,227 B2 | 9/2010 | Welles |
| 7,821,542 B2 | 10/2010 | Lee et al. |
| 7,869,908 B2 | 1/2011 | Walker |
| 7,873,450 B2 | 1/2011 | Lawry et al. |
| 7,965,312 B2 | 6/2011 | Chung et al. |
| 8,244,276 B2 | 8/2012 | Wetzel et al. |
| 8,301,330 B2 | 10/2012 | Nielsen |
| 8,386,281 B2 | 2/2013 | Goodermuth et al. |
| 2001/0032109 A1 | 10/2001 | Gonyea |
| 2002/0022984 A1 | 2/2002 | Daniel et al. |
| 2002/0049538 A1 | 4/2002 | Knapton et al. |
| 2002/0065698 A1 | 5/2002 | Schick et al. |
| 2002/0069218 A1 | 6/2002 | Sull et al. |
| 2002/0169816 A1 | 11/2002 | Meiri |
| 2003/0013458 A1 | 1/2003 | Yabe et al. |
| 2003/0017821 A1 | 1/2003 | Irvin |
| 2003/0055666 A1 * | 3/2003 | Roddy et al. ....................... 705/1 |
| 2003/0061005 A1 | 3/2003 | Manegold et al. |
| 2003/0061159 A1 | 3/2003 | Adams et al. |
| 2003/0069694 A1 | 4/2003 | Fuchs et al. |
| 2003/0109972 A1 | 6/2003 | Tak |
| 2003/0132855 A1 | 7/2003 | Swan |
| 2003/0134626 A1 | 7/2003 | Himmel et al. |
| 2005/0023347 A1 | 2/2005 | Wetzel |
| 2005/0171661 A1 | 8/2005 | Abdel-Malek |
| 2005/0209777 A1 | 9/2005 | Peltz |
| 2006/0161313 A1 * | 7/2006 | Rogers et al. ....................... 701/1 |
| 2007/0150130 A1 | 6/2007 | Welles |
| 2007/0194115 A1 | 8/2007 | Logan |
| 2007/0240161 A1 | 10/2007 | Prabhakar et al. |
| 2007/0295800 A1 | 12/2007 | Staats |
| 2009/0106320 A1 | 4/2009 | Dageville et al. |
| 2009/0197228 A1 | 8/2009 | Afshar et al. |
| 2009/0282272 A1 | 11/2009 | Bestgen et al. |
| 2011/0112932 A1 * | 5/2011 | Chen ........................... 705/27.1 |
| 2011/0167434 A1 | 7/2011 | Gaist |
| 2011/0172879 A1 | 7/2011 | Abe |
| 2011/0321055 A1 | 12/2011 | Moore et al. |
| 2012/0259884 A1 | 10/2012 | Donehue |
| 2013/0067464 A1 | 3/2013 | Shah |
| 2013/0080417 A1 | 3/2013 | Kashyap |
| 2013/0152099 A1 | 6/2013 | Bass et al. |
| 2013/0159286 A1 | 6/2013 | Manzano Macho et al. |
| 2013/0178592 A1 | 7/2013 | Bette et al. |
| 2013/0318069 A1 | 11/2013 | Aluç et al. |
| 2014/0085086 A1 * | 3/2014 | Knapp ................... G06Q 10/06 340/540 |
| 2014/0365046 A1 * | 12/2014 | Madsen ......................... 701/19 |

FOREIGN PATENT DOCUMENTS

| | | |
|---|---|---|
| EP | 1280119 A1 | 1/2003 |
| GB | 2375407 A | 11/2002 |
| WO | 9511484 | 4/1995 |

OTHER PUBLICATIONS

Electronic ERA Test and Inspection System; General Overview 10East teams up with Sharp Electronics to equip CSX maintenance forces with a data collection, management, and reporting solution for

(56) References Cited

OTHER PUBLICATIONS monitoring Federally mandated safety compliance of the railroads infrastructure. 10East, Inc. (7 pgs.), 2009.
Electronic FRA Test and Inspection System, General, Overview. 10EAST, Inc. (16 pgs.), 2009.
Personal Mobile Tool. 10EAST, Inc.; www.10EAST.com/index.cgi?sect=personal mobile tool (3 pgs.) Jul. 28, 2003.
Sun Microsystems. Sun's Java 2 Platform, Micro Edition (J2ME) Enables Wireless Phone to Serve as Cost-Effective Input Device for Mobile Task Management Solution. WiredTime.com, 2009.

* cited by examiner

SERVICES SUPPORT SYSTEM AND METHOD

CROSS-REFERENCE TO RELATED APPLICATIONS

This application claims priority to U.S. Provisional Application No. 61/874,178, which was filed on 5 Sep. 2013, and is titled "Services Support System And Method," the entire disclosure of which is incorporated by reference.

FIELD

Embodiments of the subject matter described herein relate to guiding a user through examination and/or repair of one or more components of equipment.

BACKGROUND

Some known systems provide guidance to users during the examination and/or repair of equipment, such as vehicle systems. These systems can provide relatively generic instructional guides that direct the user how to repair or replace parts of the equipment. These guides may be limited to text-based instructions that do not visually instruct the user how to perform the examination and/or repair. Additionally, some of these guides may include directives to the user that result in the user taking relatively unsafe actions. Moreover, these guides typically are provided without regard to how long the repair and/or examination will take, the cost of the repair and/or examination, and the availability of necessary tools or equipment for conducting the repair and/or examination.

BRIEF DESCRIPTION

In one embodiment, a method (e.g., for remotely supporting users to obtain assistance from one or more remotely located resources to repair, replace, diagnose, and the like, component subsystems of equipment on which the users are working) includes receiving identification information of a potential problem with a remotely located component subsystem of subject equipment from a user located proximate to the subject equipment via a mobile device and responding to receiving the identification information by providing a recommended work scope to the user via the mobile device. The recommended work scope includes a recommended series of actions to perform to at least one of repair or replace the component subsystem. The method also can include responding to receiving the identification information by sending a recommended work scope to the user via the mobile device. The recommended work scope including a recommended series of actions to perform to at least one of repair or replace the component subsystem and the recommend work scope also including a first instructional representation for display on the mobile device. The first instructional representation both illustrating at least one action of the series of actions to perform and including at least one annotation to represent an alert to the user that is related to the action being illustrated. The first instructional representation including a series of images, videos, or a combination of images and videos that are configured to be displayed on the mobile device to guide the user through the recommended work scope. The first instructional representation configured to display one or more of the images, videos, or the combination of the images, videos, or the combination of images and videos that represent one or more of the actions in the recommended series of actions that correspond to one or more actions actually being performed by the user while the user is performing the one or more actions. One or more operations of this method can be performed by one or more computer processors. For example, hardware circuits or circuitry that includes and/or is connected with one or more microprocessors can perform one or more operations of this method.

In another embodiment, a system (e.g., a services support system) includes an analysis system configured to receive identification information of a potential problem with a remotely located component subsystem of subject equipment from a user located proximate to the subject equipment via a mobile device. The analysis system also is configured to respond to receipt of the identification information by providing a recommended work scope to the user via the mobile device. The recommended work scope includes a recommended series of actions to perform to at least one of repair or replace the component subsystem. The analysis system also is configured to respond to receiving the identification information by sending a recommended work scope to the user via the mobile device. The recommended work scope includes a recommended series of actions to perform to at least one of repair or replace the component subsystem and the recommend work scope also including a first instructional representation for display on the mobile device. The first instructional representation both illustrates at least one action of the series of actions to perform and includes at least one annotation to represent an alert to the user that is related to the action being illustrated. The first instructional representation including a series of images, videos, or a combination of images and videos that are configured to be displayed on the mobile device to guide the user through the recommended work scope. The first instructional representation configured to display one or more of the images, videos, or the combination of images and videos that represent one or more of the actions in the recommended series of actions that correspond to one or more actions actually being performed by the user while the user is performing the one or more actions.

In another embodiment, a method (e.g., for remotely supporting users) includes determining a difference between a designated characteristic of a first component of a first vehicle system and one or more actual characteristics of the first component, identifying at least one of a replacement component in an inventory stock of components or a currently used component in a second vehicle system responsive to the difference between the designated characteristic and the one or more actual characteristics being outside of a designated range of differences so that the first component of the first vehicle system can be replaced with the replacement component or the currently used component of the second vehicle system, and displaying a notification on a display device of the at least one of the replacement component or the currently used component so that a user of the display device can determine whether to replace the first component with the replacement component or the currently used component.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein relate to a services support system and method that allows users of mobile devices to remotely obtain assistance with the monitoring, diagnosing, repair, replacement, and the like, of components of equipment (also referred to as assets). Several non-limiting examples are provided herein of the types of assistance that may be obtained by users located remotely from the sources of the assistance (also referred to as an analysis system and/or resources), but not all embodiments are limited to the examples provided herein. At least one technical effect of the subject matter described herein is the safe guidance of a user from a remote location through one or more workflows to repair or replace a component subsystem of equipment in a manner that warns the user of unsafe practices and/or situations, while also allowing the user to notify the remote location of one or more unsafe practices or situations involved with performance of the guidance being provided.

At least one technical effect provided by the inventive subject matter described herein includes remotely guiding a user through the examination, repair, and/or replacement of a component subsystem of equipment using instructions presented on a mobile device used by the user. The user may provide feedback to alter the guidance that is provided to one or more other users, and may be required to acknowledge one or more warnings during the examination, repair, and/or replacement of the component subsystem.

Figure 1:
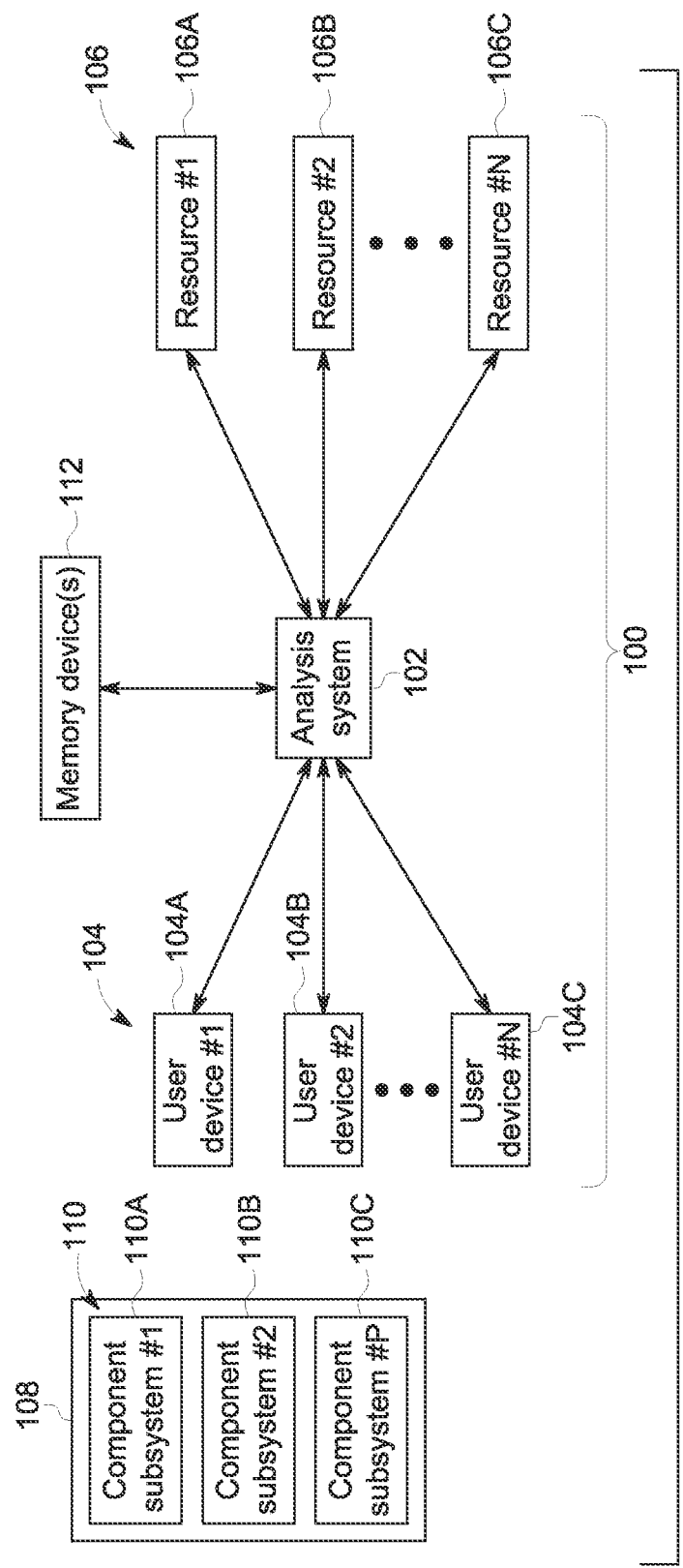
FIG. 1 is a schematic diagram of an embodiment of a services support system.

FIG. 1 is a schematic diagram of an embodiment of a services support system 100. The support system allows one or more users to obtain assistance from one or more remotely located resources to repair, replace, diagnose, and the like, component subsystems of equipment on which the users are working or near. In the illustrated example, the support system includes an analysis system 102 that includes or represents a controller and provides an interface between user devices 104 (e.g., user devices 104A-C) and one or more remotely located resources 106 (e.g., resources 106A-C). Although only three user devices and three resources 106 are shown in FIG. 1, a lesser or larger number of user devices and/or resources may be provided, including a single user device and/or a single resource 106. The analysis system, user devices, and/or resources can represent one or more processors, controllers, computer systems (e.g., two or more networked computers), or other logic-based devices (referred to herein as processing devices) that perform the operations described herein. In one aspect, one or more of these processing devices may be an off-the-shelf hardware computer product that operates according to one or more sets of instructions (e.g., software systems or applications) stored on a tangible and non-transitory medium, such as a computer hard drive, ROM, RAM, EEPROM, or the like. The operations described herein may be encoded into the sets of instructions by a computer software programmer. Optionally, one or more of these processing devices may be a hardware computer product that is hard-wired with these sets of instructions. For example, the operations described herein may be hard-wired into the logic of the processing devices when the processing devices are manufactured.

In one aspect, the user devices are mobile devices, such as handheld devices that can be relatively easily moved by an average human being without the aid of machines. For example, the user devices can represent mobile phones, tablet computers, laptop computers, and the like. The user devices may be used by one or more human users (also referred to as operators) to obtain guidance in the diagnosing of one or more causes of problems (e.g., faults) of equipment 108, as well as in the repair and/or replacement of one or more component subsystems 110 (e.g., subsystems 110A-C) of the equipment 108.

The equipment can represent a variety of assets being examined, repaired, and/or maintained by the users, such as a vehicle (e.g., a rail vehicle, mining equipment, an automobile, a marine vessel, or the like), a stationary power-generating system (e.g., an engine, a generator, an alternator, or the like), or another machine or system. The equipment includes several component subsystems that perform various functions for operation of the equipment. With respect to vehicles, the subsystems can include engines, motors, turbochargers, filters, cooling systems, wheels, brakes, or the like. Optionally, the subsystems can include one or more other components. Although the equipment is shown as including only three subsystems, the equipment can include a different number of subsystems, including a single subsystem.

In operation, one or more users that are located at or near the equipment can examine the equipment for one or more problems or potential faults with the equipment. These problems and/or faults may be manually obtained by the users measuring one or more parameters of the component subsystems (e.g., outputs, dimensions, temperatures, speeds, or the like). Additionally or alternatively, one or more of these problems and/or faults may be automatically measured by one or more sensors of the equipment and reported to the users and/or the user devices (e.g., by display on a display screen of the equipment, via one or more wired and/or wired connections between the equipment and/or the user devices, or the like).

The user devices provide user interfaces in order to allow information about the equipment and/or component subsystems to be input into the user devices. This information may be manually input by the users of the devices and/or automatically obtained from the equipment.

Figure 2:
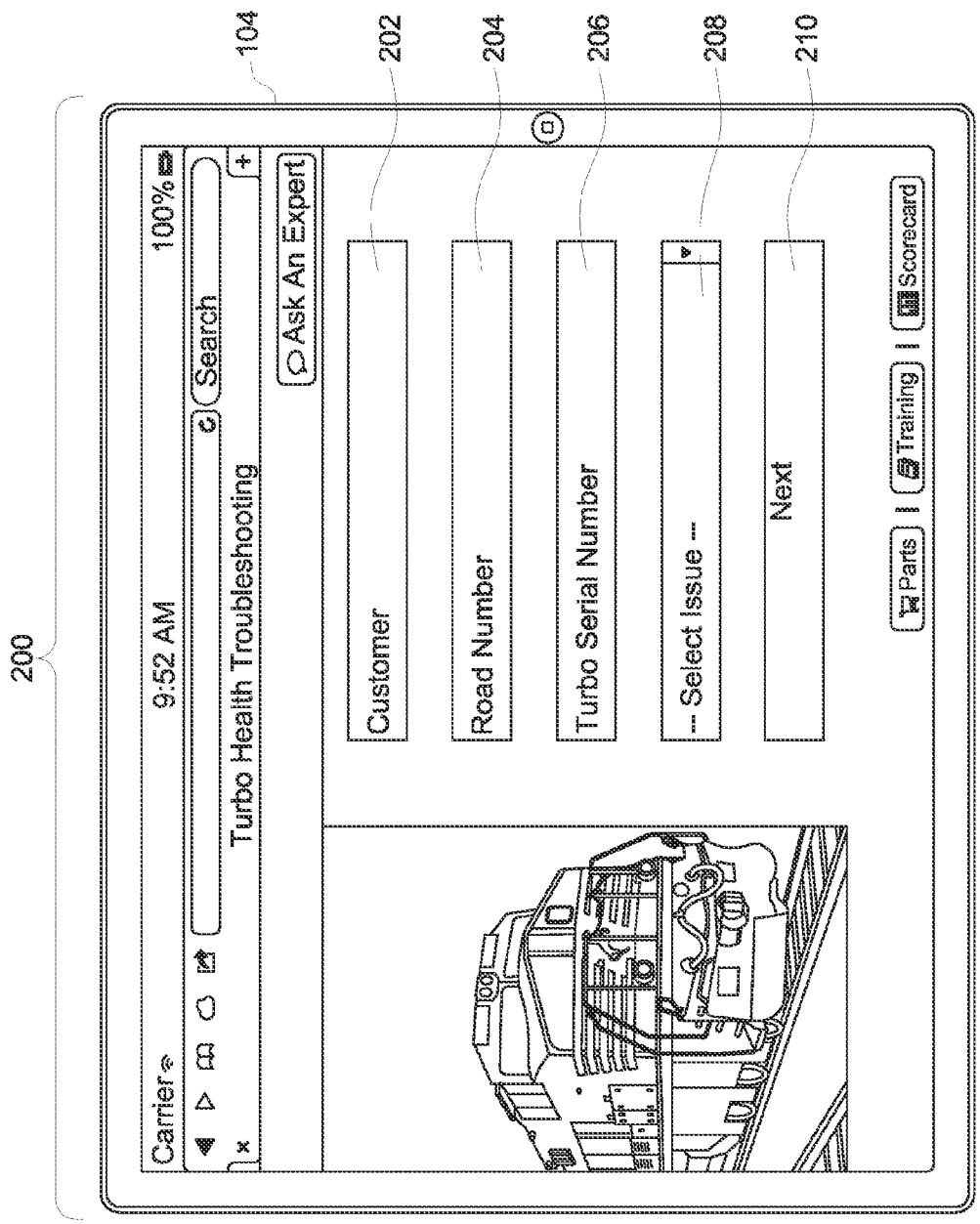
FIG. 2 illustrates an example of a user interface displayed by one or more user devices shown in FIG. 1.

FIG. 2 illustrates an example of a user interface 200 displayed by the user devices. The user interface 200 can represent a set of graphic elements that is displayed on a screen of the user device, such as on a touchscreen, computer monitor, or the like. The user interface 200 includes several input windows 202, 204, 206, 208 for receiving identification information from the user and/or equipment. While the user interface 200 represents an input screen that receives information about a locomotive, optionally, the interface 200 may receive other information and/or information about equipment other than a locomotive. While four interface-displays or input windows 202, 204, 206, 208 are shown, a lesser or larger number of windows may be selected based on application specific requirements, and/or the windows may be used to receive other information than what is described herein.

The identification information includes information or data representative of the user, the equipment, the component subsystem, a potential problem identified for the equipment and/or subsystem, or other information indicative of a potential problem or fault that is being examined. The potential problem can include a fault with the equipment and/or subsystem that is unknown and/or can include a fault that is unknown (and the user is attempting to determine if there is, in fact, a problem with the machine and/or subsystem).

The input window 202 can be used to input identification information that represents the user, the owner of the equipment and/or component subsystem that is being examined, repaired, and/or replaced, the manufacturer of the equipment and/or subsystem 110, or other identifying information. For example, the user may enter customer identification information in the window 202 that represents the company that owns the equipment and/or component subsystem. The information that is input into the window may be manually input by the user and/or automatically input, such as by one or more sensors or other devices (e.g., transponder, bar code reader, or the like). This information can be used by the analysis system to narrow down the potential faults of the equipment and/or component subsystems and/or the potential solutions to fixing these potential faults from a larger corpus of potential faults and/or solutions, as described below.

The input window 204 can be used to input identification information that represents the equipment that is being examined, repaired, and/or replaced, or that includes the component subsystem being examined, repaired, and/or replaced. For example, the user may enter a serial number or other data that identifies the type, name, year of manufacture, or the like, of the equipment. The information that is input into the window 204 may be manually input by the user and/or automatically input, such as by one or more sensors or other devices (e.g., transponder, bar code reader, or the like). This information can be used by the analysis system to narrow down the potential faults of the equipment and/or component subsystems and/or the potential solutions to fixing these potential faults from a larger corpus of potential faults and/or solutions, as described below. For example, the types of faults and/or solutions that may be applicable to one type of equipment may not be applicable to another type of equipment. The non-applicable faults and/or solutions may be eliminated as possibilities for use in examining, repairing, and/or replacing one or more component subsystems of the equipment.

The input window 206 can be used to input identification information that represents the component subsystem that is being examined, repaired, and/or replaced. For example, the user may enter a serial number or other data that identifies the type, name, year of manufacture, or the like, of the subsystem. The information that is input into the window 206 may be manually input by the user and/or automatically input, such as by one or more sensors or other devices (e.g., transponder, bar code reader, or the like). This information can be used by the analysis system to narrow down the potential faults of the component subsystems and/or the potential solutions to fixing these potential faults from a larger corpus of potential faults and/or solutions, as described below. For example, the types of faults and/or solutions that may be applicable to one type of component subsystem may not be applicable to another type of subsystem. The non-applicable faults and/or solutions may be eliminated as possibilities for use in examining, repairing, and/or replacing one or more component subsystems of the equipment.

After entering some or all of this identification information, the user may select a progression icon 210 on the user interface. Selection of this icon may inform the user device that the identification information has been provided. Optionally, the user device may automatically determine when the identification information is received.

In response to receiving at least some of this identification information into the user device via the user interface, at least one of the user device and/or the analysis system identifies one or more potential problems with the equipment and/or component subsystem that is identified by or associated with the identification information. For example, one or more memory devices 112 (shown in FIG. 1) that are accessible to the user device and/or the analysis system may store lists, tables, databases, or other memory structures that group or otherwise associate potential problems with various equipment and/or component subsystems. Suitable memory device(s) may include computer hard drives, flash drives, ROM, RAM, removable drives, EEPROM, or the like, that is disposed within or otherwise coupled with the user device and/or analysis system, and/or that is remote from (e.g., not connected to or included within) the user device and/or the analysis system.

The memory devices can associate different groups of potential problems with different equipment and/or component subsystems. For example, a first locomotive having a first road number may be associated with a first group of potential problems that have occurred with that locomotive and/or similar locomotives, while a different, second locomotive having a different, second road number may be associated with a different, second group of potential problems that have occurred with that locomotive and/or similar locomotives.

Using the associations between different equipment and/or subsystems and the different groups of potential problems, the user device can present a list of potential problems to the user on the user interface 200. For example, the user device can communicate the identification information to the analysis system and the analysis subsystem can examine the memory devices to determine what group of potential problems are associated with the equipment and/or component subsystem identified by the identification information. As another example, the user device can examine the memory devices to determine what group of potential problems are associated with the equipment and/or component subsystem identified by the identification information.

Figure 3:
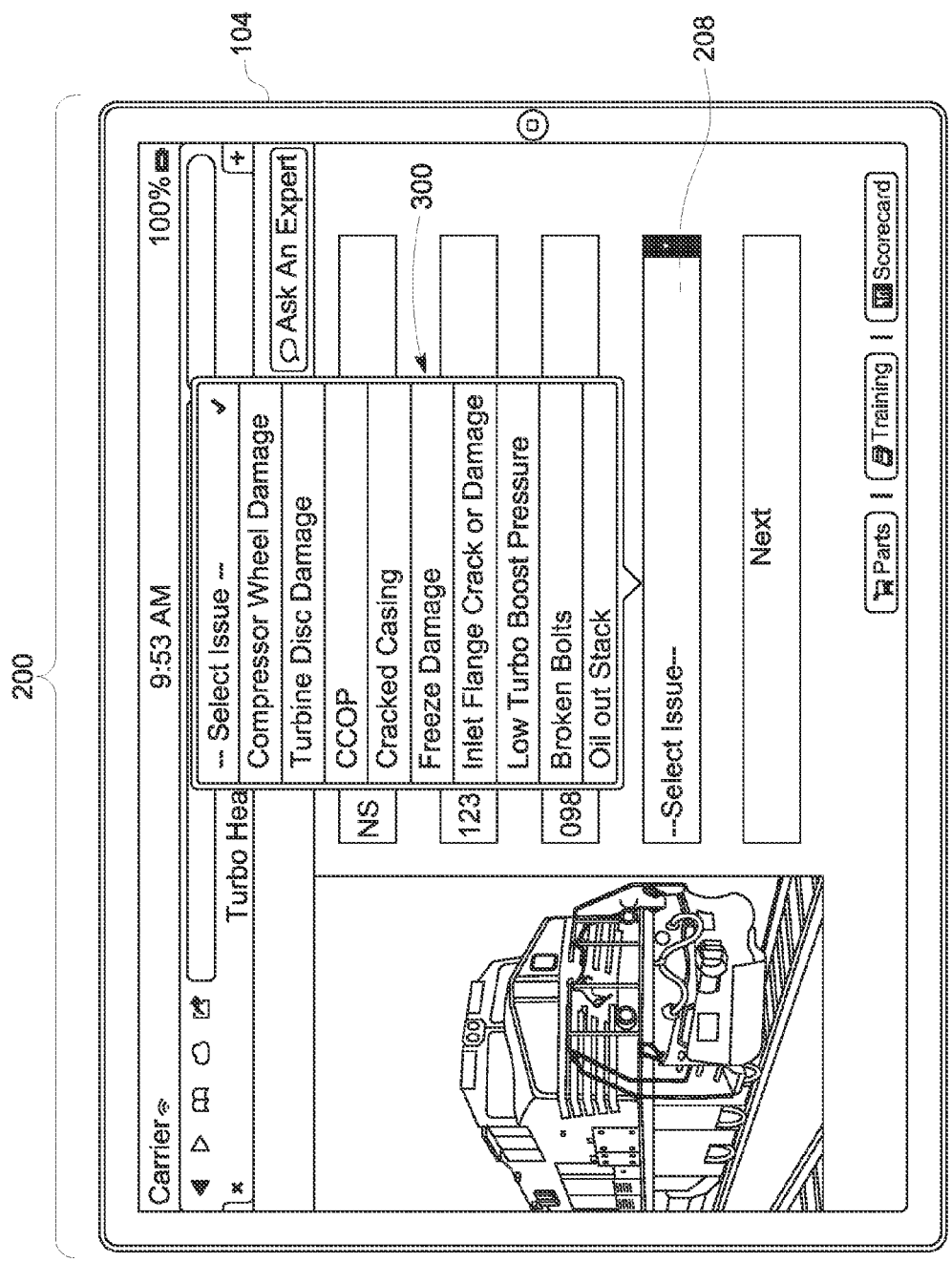
FIG. 3 illustrates another example of a user interface that can be displayed by the user devices.

FIG. 3 illustrates another example of the user interface displayed by the user devices. Responsive to receiving the identification information, a group of one or more potential problems associated with the equipment and/or component subsystem under examination may be presented on the user device. In the illustrated example, a list 300 of user-selectable potential problems is displayed as emanating from the window 208. Optionally, the potential problems may be presented in another manner. The list shown in FIG. 3 includes several potential problems associated with a rail vehicle, such as a locomotive. If other identification information had been provided, then another list of potential problems may be displayed. The user can select one or more of these potential problems in the list, such as by pressing the touchscreen or using a stylus, electronic mouse, or the like, to select one or more potential problems of the component subsystem and/or equipment.

The selected potential problem is used by the user device and/or analysis system to identify one or more recommended work scopes for examining, repairing, or replacing one or more component subsystems of the equipment. The work scope also may be referred to as a workflow, and can include a set (e.g., a series) of actions that are to be performed in the examination, repair, and/or replacing of one or more parts, component subsystems, and/or the equipment.

Figure 4:
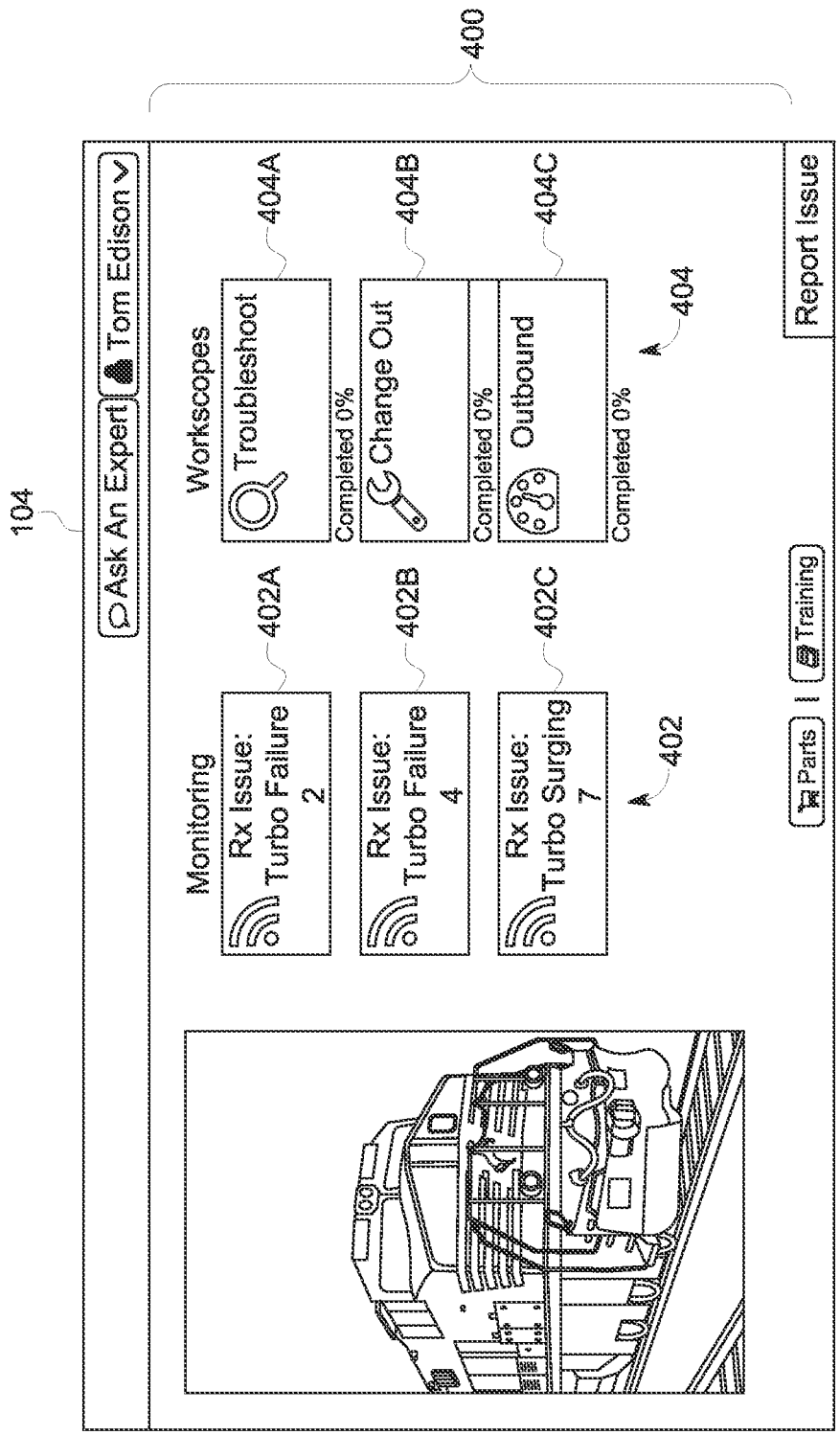
FIG. 4 illustrates another example of a user interface that may be presented on the user device.

FIG. 4 illustrates another example of a user interface 400 that may be presented on the user device. The user interface may be displayed responsive to the user selecting the one or more potential problems of the component subsystem and/or equipment, as described above.

The user interface displays one or more monitoring icons 402 (e.g., icons 402A-C) and/or one or more work scope icons 404 (e.g., icons 404A-C). The number of icons 402 and/or icons is merely one example as a larger or smaller number of the icon 402 and/or the icon may be displayed.

The monitoring icons may be selected by the user (e.g., by touching, "clicking," and so on, the icons on the user device) to cause data from or about the component subsystem and/or equipment to be communicated to the user device, the analysis system, and/or one or more of the resources. Sensors may be connected with or disposed relatively near the component subsystem and/or the equipment being examined. Selecting one or more of the monitoring icons can cause the sensors associated with measuring data about the component subsystem and/or the equipment related to the respective icon 402 to communicate data to the user device, the analysis system, and/or one or more of the resources.

In the illustrated example, the monitoring icon 402A may be selected to cause a designated group of sensors associated with a first potential cause of failure (e.g., failure of a turbocharger) to obtain data. These sensors may include pressure sensors to measure exhaust pressure in the turbocharger, flow rate sensors to measure the flow of exhaust through the turbocharger, or the like. The monitoring icon 402B may be selected to cause a different designated group of sensors associated with a different second potential cause of failure (e.g., failure of the same turbocharger) to obtain data. The monitoring icon 402C may be selected to cause a designated group of sensors associated with a potential cause of a designated performance (e.g., surging of a turbocharger) to obtain data. The sensors included in these groups may be the same or different for two or more of the icons.

The data that is obtained from the sensors can be communicated to the analysis system and/or the resources to identify a potential problem of the component subsystem and/or equipment. By way of example, this data may include, but is not limited in all embodiments to, temperatures, pressures, speeds, horsepower, voltage, amperes, and the like, of the equipment and/or component subsystems. The analysis system and/or the resources may examine the sensor data to predict a potential problem of the equipment and/or component subsystems. For example, the analysis system may examine the sensor data to determine if the data exceeds or falls below thresholds, exhibits trends, or otherwise indicates a potential fault. This potential fault may be automatically presented to the user on the user device and/or may be automatically selected as a user selected potential problem. Alternatively, the sensor data may be examined by the user device to identify the potential problem.

In one aspect, the user device and/or analysis system may diagnose faults to identify potential problems with the equipment and/or component subsystems. For example, one or more systems for isolating failures in equipment, such as a locomotive, may be used to identify a cause of failures occurring in the equipment and/or component subsystems of the equipment with incorporating information provided by an operator (e.g., the user of the user device) to produce a diagnosis of the failures. One or more of the user device and/or the analysis system may include a fault isolator. This fault isolator can use a diagnostic knowledge base stored in the memory device to produce a list of the most likely causes for a failure. This list may represent the list shown in FIG. 3. Potential problems can be presented to the user for selection in the list 300 or may selected by the user device and/or analysis system based on the identification information received via the user device.

The memory device may include recommended work scopes associated with the potential problem selected by the user and/or identified using the sensor data. Once a potential problem is selected or identified, the analysis system and/or resources may identify one or more work scopes that are recommended for addressing (e.g., fixing) the potential problem. These identified work scopes are communicated to the user device (or pointers to the work scopes in the memory device are sent to the user device, which may obtain the work scopes from the memory device).

The work scopes include a recommended series of one or more actions to perform on or with the equipment and/or component subsystem in order to further examine, maintain, repair, or replace the equipment and/or component subsystem of the equipment that is associated with the selected problem.

The recommended work scope may be selected by the analysis system and/or user device from plural different work scopes stored in the memory device. The selected work scope may be identified from a larger group of potential work scopes using the selected potential problem and/or at least some of the identification information provided by the user device. For example, the memory device may store a corpus of work scopes that are each associated with various potential problems and different types of identification information. The work scope that is recommended to the user may be selected from this corpus.

In one example, for a first type of equipment (e.g., a locomotive) having a first type of component subsystem (e.g., a turbocharger) and a first potential problem identified by the user, one or more first work scopes may be stored in the memory device 112. The same type of equipment (e.g., a locomotive) having a different, second type of component subsystem (e.g., a turbocharger provided from an entity other than General Electric Co.) and the same first potential problem may one or more different, second work scopes stored in the memory device 112. If the information that is input into the user device more closely matches the identification information associated with the one or more second work scopes than the one or more first work scopes, then the recommended work scope may include or be selected from the one or more second work scopes.

As another example, the analysis system can examine user-selected faults (e.g., problems) and/or sensor data of the equipment and/or component subsystems over a wired and/or wireless connection (e.g., the Internet, an internet, or another network) to identify a repair that is likely to be successful in curing the selected faults. The analysis system and/or the user device can identify the work scope likely to fix the selected problem.

Optionally, plural recommended work scopes may be identified using the identification information and/or selected problem received from the user device. Two or more work scopes stored in the memory device may be associated with the same potential problem and identification information that is selected using the user device, as described above. As one example, if the potential problem that is selected by the user is "low turbo boost pressure" (e.g., the turbocharger is producing a smaller pressure increase than expected), then the analysis system and/or user device may determine that two or more recommended work scopes are associated with this potential problem (and/or with the identified type of equipment, component subsystem, and/or other identification information). One recommended work scope may involve further examination of the turbocharger, another recommended work scope may involve further examination of the engine having exhaust that travels through the turbocharger, another recommended work scope may involve replacing one or more parts of the turbocharger, another recommended work scope may involve replacing the entire turbocharger, and the like.

In one aspect, the multiple work scopes that are associated with the selected potential problem and/or the identification information provided by the user device may be presented to the user. For example, the analysis system may direct the user device to display a list, menu, or other arrangement of the several work scopes associated with the potential problem and input information. The user may then select which of these work scopes to perform, such as by touching the touch screen of the user device and/or using another input device (e.g., a stylus, keyboard, microphone, or the like) that can be used with the user device.

Additionally or alternatively, these multiple work scopes may be presented (e.g., displayed) on the user device along with selection impact notifications for one or more, or each, of the work scopes. These notifications may instruct the user of the potential effect of selecting one work scope over another work scope. For example, the selection impact notification for each (or one or more of, but not all) of the multiple work scopes may include an estimated time to complete the respective work scope and/or an estimated cost to complete the respective work scope. The user may view these estimated times and/or costs and select a work scope using the estimated times and/or costs.

The estimated times and/or costs may be determined by the analysis system. The analysis system may maintain a historical log of one or more previous uses (e.g., performances) of the various work scopes of various types of equipment and/or component subsystems 108. This log may include indications of how long it previously took to complete the work scopes and/or the cost involved in completing the work scopes. Additionally or alternatively, the estimated completion times and/or costs may be based on heuristic determinations by human users. The estimated completion times and/or costs may be varied based on the availabilities of various resources. The resources shown in FIG. 1 may represent human technicians having various skill sets needed or required to perform one or more actions in a work scope, tools or other equipment needed or required to perform one or more actions in the work scope, replacement parts needed or required to perform one or more actions in the work scope, and the like. The analysis system can track the availabilities of these resources (as described below) and, based on these availabilities, change the estimated completion times and/or costs. For example, as the availability of a needed resource 106 decreases, the estimated time and/or cost may increase. Conversely, as the availability increases, the estimated time and/or cost may not change or may decrease.

Another example of a selection impact notification that may be provided alongside or along with each of (or one or more of) the plural recommended work scopes may be an estimated service life. The estimated service life represents an additional amount of time that the equipment and/or component subsystem is expected to perform at or above one or more designated thresholds (e.g., of outputs of the equipment and/or component subsystem) if the recommended work scope that is associated with the estimated service life is completed. For example, a first recommended work scope may involve cleaning a manifold of an exhaust system, a second recommended work scope (for the same selected problem) may involve replacing a filter of the exhaust system, and a third recommended work scope (for the same selected problem) may involve replacing the manifold of the exhaust system. The estimated service life for the third recommended work scope may be longer than the estimated service life for the first and second recommended work scopes because the third recommended work scope replaces a potentially broken or worn down part of the exhaust system. But, this third recommended work scope also may be associated with additional selection impact notifications that indicate longer estimated completion times and/or costs than the first and second recommended work scopes. The user may examine the selection impact notifications and use these notifications to select which work scope should be performed to fix the selected problem.

Estimated service lives may be determined by the analysis system. The analysis system may maintain a historical log of one or more previous uses (e.g., performances) of the various work scopes of various types of equipment and/or component subsystems. This log may include indications of how long the equipment and/or component subsystems continued to operate at or above one or more performance thresholds following performance of the work scope (e.g., the service lives). Additionally or alternatively, the estimated completion times and/or costs may be based on heuristic determinations by human users.

In one aspect, one or more of the resources may represent a human that reviewed a recommended work scope selected by the analysis system before the recommended work scope of sent to the user device. For example, the human may be a skilled technician or expert in the equipment and/or component subsystem being serviced by the user of the user device. The analysis system may identify one or more recommended work scopes based on the information provided by the user device, as described above. Before sending these one or more recommended work scopes to the user device, however, the analysis system may send the recommended work scopes to the skilled technicians and/or experts. These persons may be located remote from the analysis system, equipment and/or component subsystem being serviced, and/or the user device. These persons may review the recommended work scopes provided by the analysis system and approve (e.g., select) one or more, or all, of these work scopes to be sent to the user device. These persons may use their knowledge and experience to select a work scope that is better or best suited for the particular problem identified by the user device, for example.

In the example illustrated in FIG. 4, the user device displays three work scope icons 404 to the user, although another number of work scope icon(s) may be displayed. The icon 404A represents a troubleshooting work scope. Selection of this icon 404A will cause the user device to present a work scope to the user that guides the user through several actions that examine operations of the component subsystem and/or equipment prior to repair or replacement of the subsystem, equipment, or parts thereof. These actions may obtain additional data and/or information to allow the user, the user device, the analysis system, and/or the resources to further identify problems and/or faults in the component subsystem and/or equipment.

The icon 404B represents a change out work scope. Selection of this icon 404B will cause the user device to present a work scope to the user that guides the user through several actions that repair or replace the component subsystem and/or equipment, and/or repair or replace one or more parts of the subsystem and/or equipment.

The icon 404C represents an outbound checkup work scope. Selection of this icon 404C will cause the user device to present a work scope to the user that guides the user through several actions that examine operations of the component subsystem and/or equipment after repair or replacement of the subsystem, equipment, or parts thereof. These actions may obtain data and/or information to allow the user, the user device, the analysis system, and/or the resources to assess performance of the component subsystem and/or equipment and to determine if the repair or replacement of the subsystem, equipment, or parts thereof was successful.

Figure 5:
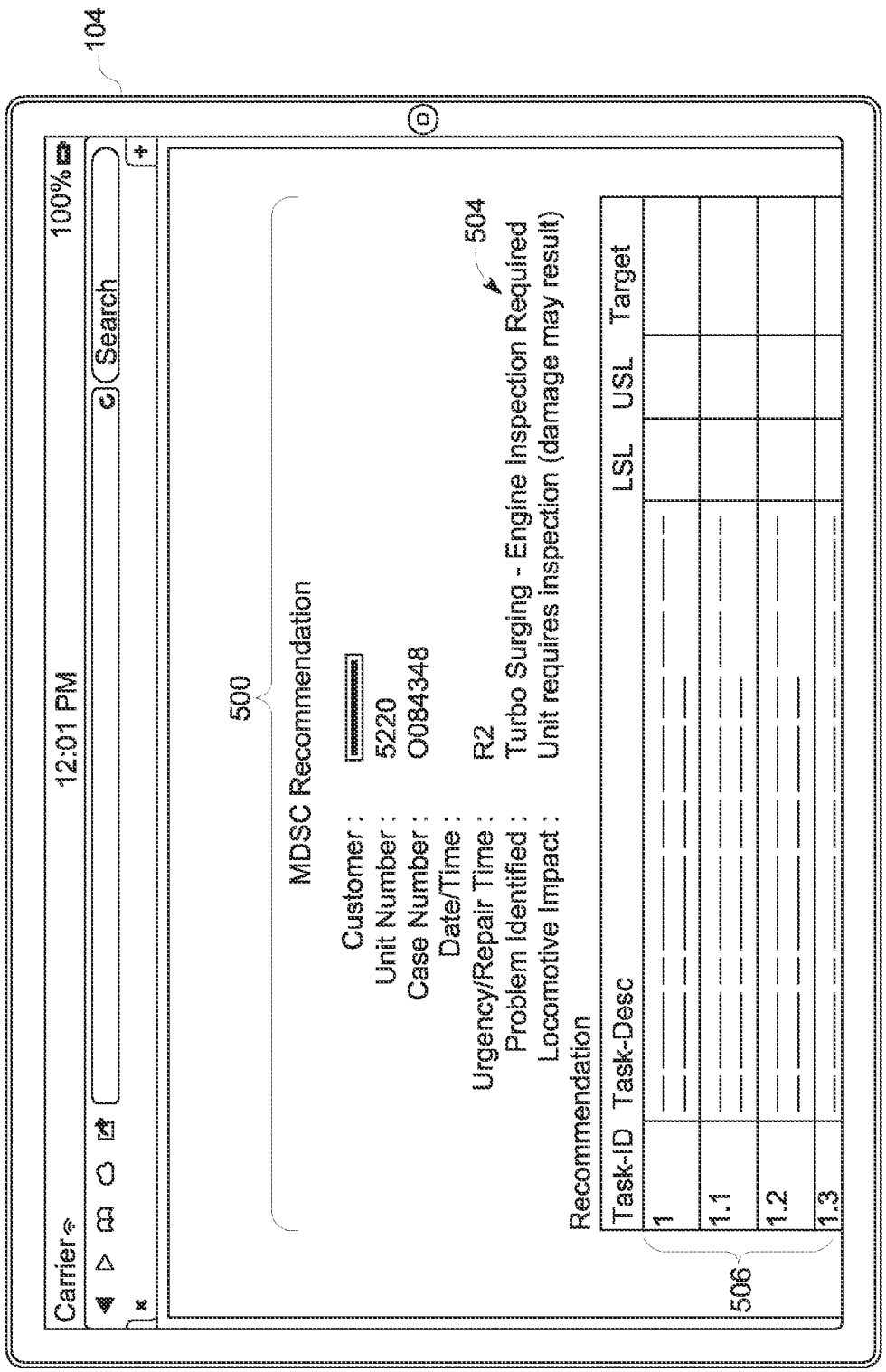
FIG. 5 illustrates an example of a recommended work scope that may be displayed on the user device.

FIG. 5 illustrates an example of a recommended work scope 500 that may be displayed on the user device. The recommended work scope 500 can be used to direct the user on how to fix or further examine a selected problem 504 of the equipment and/or component subsystem. In the illustrated example, the work scope is a text-based Monitoring and Diagnostics Service Center (MDSC) recommendation that includes several actions 506 (e.g., operations, steps, or the like) to be sequentially performed in order to further examine, repair, and/or replace the equipment and/or component subsystem associated with the selected problem 504. Alternatively, the work scope can include another type of recommendation to remedy the selected problem. The selected problem used in the illustrated example is a turbocharger that is surging. As a solution to this problem, the work scope recommends performing the listed actions to perform an inspection of an engine of the equipment.

Additionally or alternatively, the recommended work scope that is provided to the user via the user device includes one or more non-textual instructional representations displayed on the user device (or another display device at or near the equipment and/or component subsystem) that guide the user through the actions 506 of the recommended work scope. These non-textual instructional representations may include images (e.g., schematic diagrams, photographs, drawings, static or non-moving two dimensional images, static three dimensional images, or the like), videos (e.g., moving images), sounds (e.g., a recording of spoken instructions for performing the recommended actions, examples of sounds that the user should expect to hear and/or not expect to hear when performing the recommended actions, or the like), and/or other instructions that are not represented by text. In one example, a three-dimensional image of one or more parts or component subsystems of the equipment may be displayed on the user device and may be manipulated by the user of the device. For example, the user may touch the user device with his or her finger and slide the finger across the user device to rotate, pivot, zoom, pan, or otherwise change the view of the image that is shown on the user device. Multiple viewpoints of the same image may be provided to the user on the user device. The user may select or alternate between which of these viewpoints are presented on the user device so that the user defines the perspective of the image.

Figure 6:
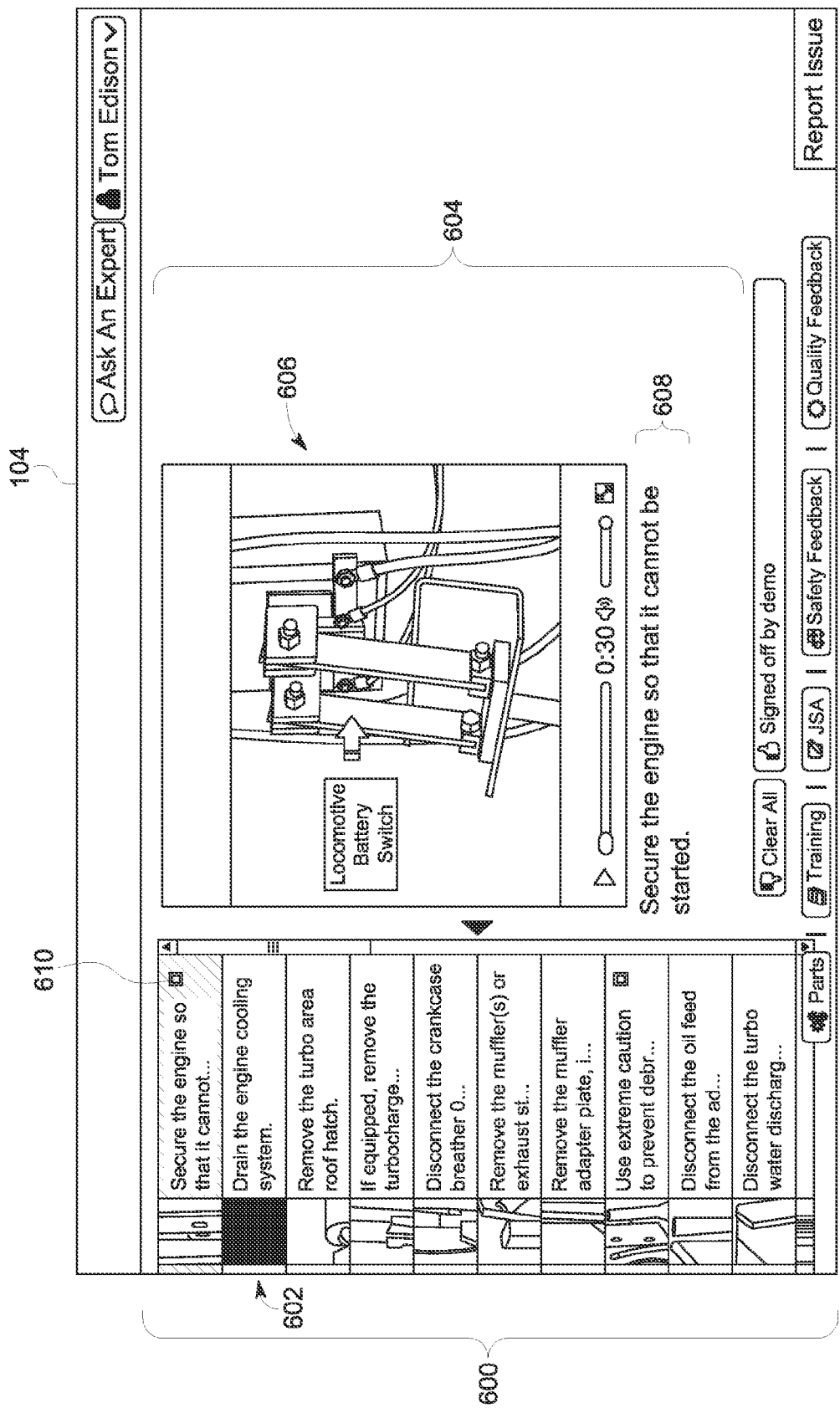
FIG. 6 illustrates another example of a recommended work scope that may be displayed on the user device.

FIG. 6 illustrates another example of a recommended work scope 600 that may be displayed on the user device. The recommended work scope can be used to direct the user on how to further examine or fix a problem or fault of the equipment and/or component subsystem. In the illustrated example, the work scope is a text-, image-, and/or video based work scope that includes several actions 602 to be performed in completing the work scope. Although ten actions are visible in FIG. 6, another number of action(s) may be provided.

The user may select one or more of the actions to perform. When an action is selected, an instructional representation or display 604 is presented on the user device. In the illustrated example, the instructional representation includes both an image 606 and text 608 that advises or guides the user through the selected action. The image may be a static image or a video (as shown in FIG. 6), or a combination thereof. Selection of another action can result in a different image and/or text being displayed in the instructional representation.

The user may perform the action described and/or represented by the instructional representation for the selected action. Once the action instructed by the representation is performed, the user may notify the user device by selecting a completion box 610 of the action, or otherwise indicating that the action is complete. In one aspect, the user may sequentially progress through the actions by performing the actions in the order shown on the user device. Optionally, the user may perform the actions in a non-sequential manner, such as by selecting and performing actions in an order that is different from the order presented on the user device.

As a result, the instructional representation of the recommended series of actions in a recommended work scope can be displayed to the user on the mobile device of the user while the user is actually performing an action that corresponds to an action in the recommended series of actions. For example, if the recommended work scope includes the series of recommended actions of removing an oil filter, draining oil from a machine, replacing the oil filter, adding oil to the machine, checking oil pressure of the machine, and the like, then the mobile device can display textual instructions, video, and/or images representative of how to remove an oil filter while the user is actually removing the oil filter, representative of how to drain the oil while the user is actually attempting to drain the oil, representative of replacing the oil filter when the user is actually replacing the oil filter and/or selecting an oil filter for use in replacing the oil filter, and the like.

Figure 7:
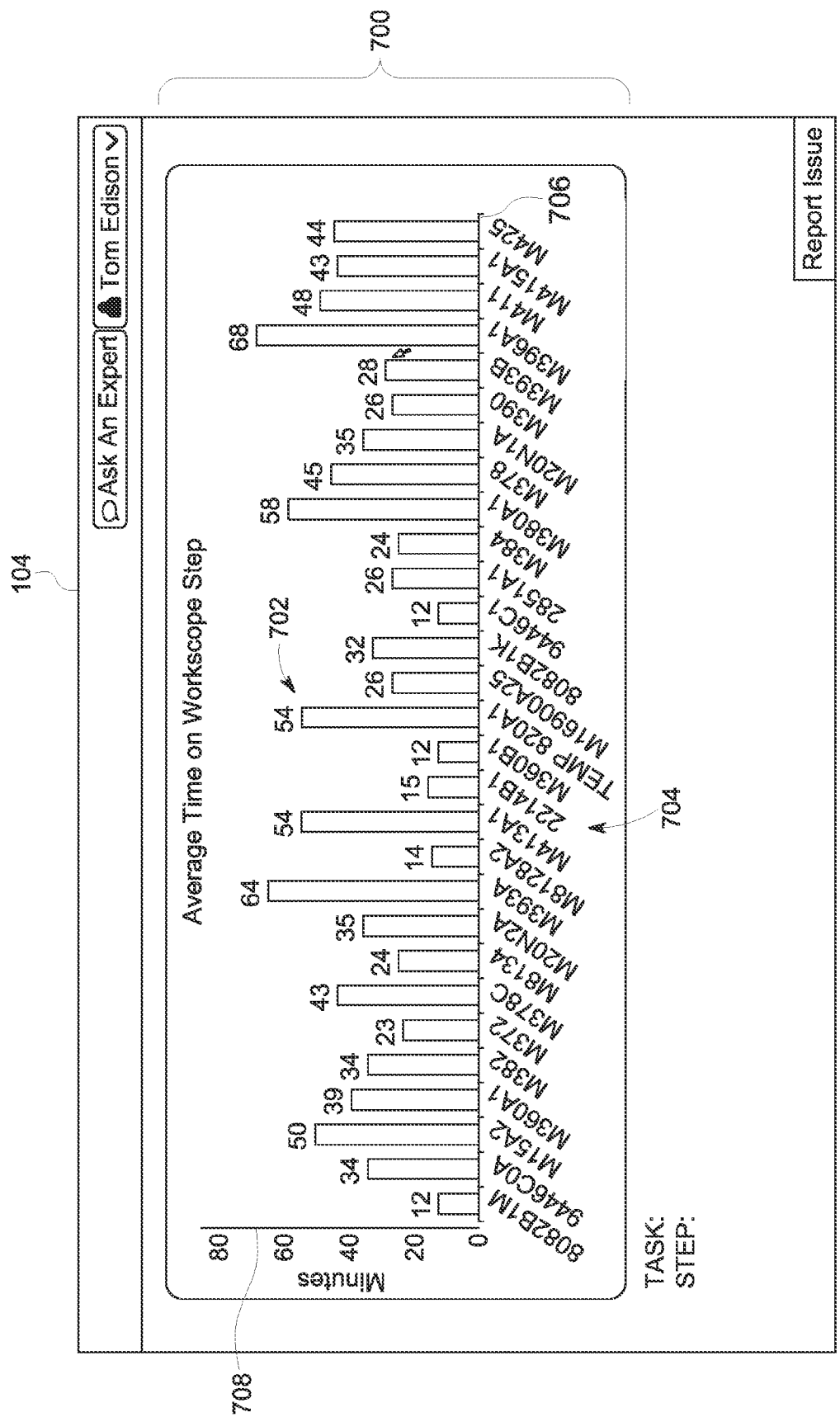
FIG. 7 illustrates an example of another user interface that can be presented to the user on the user device.

FIG. 7 illustrates an example of another user interface 700 that can be presented to the user on the user device. The user interface presents estimated completion times 702 for various actions of a recommended work scope. As described above, the analysis system (and/or the user device and/or the resources) may recommend work scopes for fixing an identified problem or fault of equipment and/or component subsystems of the equipment. The work scopes include several actions that the user is to complete to examine, repair, or replace the equipment, component subsystem, or one or more parts thereof.

In order to assist the user to select a work scope from several work scopes recommended to the user and/or to adequately prepare for performing a work scope, the analysis system can track and communicate estimated completion times to the user device for the actions of one or more of the recommended work scopes. The estimated completion times 702 shown in FIG. 7 are associated with different actions 704 of a work scope. For example, the estimated completion times are shown alongside a horizontal axis 706 representative of different actions of a work scope and a vertical axis 708 representative of different lengths of time. The larger the estimated completion time is for an action, the longer it is estimated it will take to perform and complete the action.

As described above, the estimated completion times may be tracked by the analysis system. The analysis system may maintain a historical log of one or more previous uses (e.g., performances) of the various work scopes for various types of equipment and/or component subsystems. This log may include indications of how long it previously took to complete the actions in the work scopes. Additionally or alternatively, the estimated completion times may be based on heuristic determinations by human users. The estimated completion times may be varied based on the availabilities of various resources. The analysis system can track the availabilities of these resources (as described below) and, based on these availabilities, change the estimated completion times for one or more of the actions. The analysis system can communicate the estimated completion times for one or more of the work scopes to the user device for display thereon.

The user may examine the estimated completion times to select a work scope to use and/or to plan for the completion of a work scope. For example, the user may look at the relatively long completion times for the tenth, twelfth, fifteenth, twenty-first, and twenty-sixth actions and determine that the user does not have sufficient time to perform these actions. Additionally or alternatively, the user may determine that the tools and/or other resources needed to perform these actions are not available at the times that the actions will be performed. For example, the user may determine that, based on the estimated completion times of the preceding actions, the tools or technicians needed to perform one or more actions may not be available because the tools or technicians are scheduled to be used by another person or performing other tasks at that time. Optionally, the user may determine that he or she does not have sufficient time remaining in his or her work day or shift to complete one or more of the actions. In one aspect, the user can examine the estimated completion times 702 in order to anticipate when one or more actions are likely to be performed and reserve tools or technicians to use with those actions at the times when the actions are likely to be performed.

Figure 8:
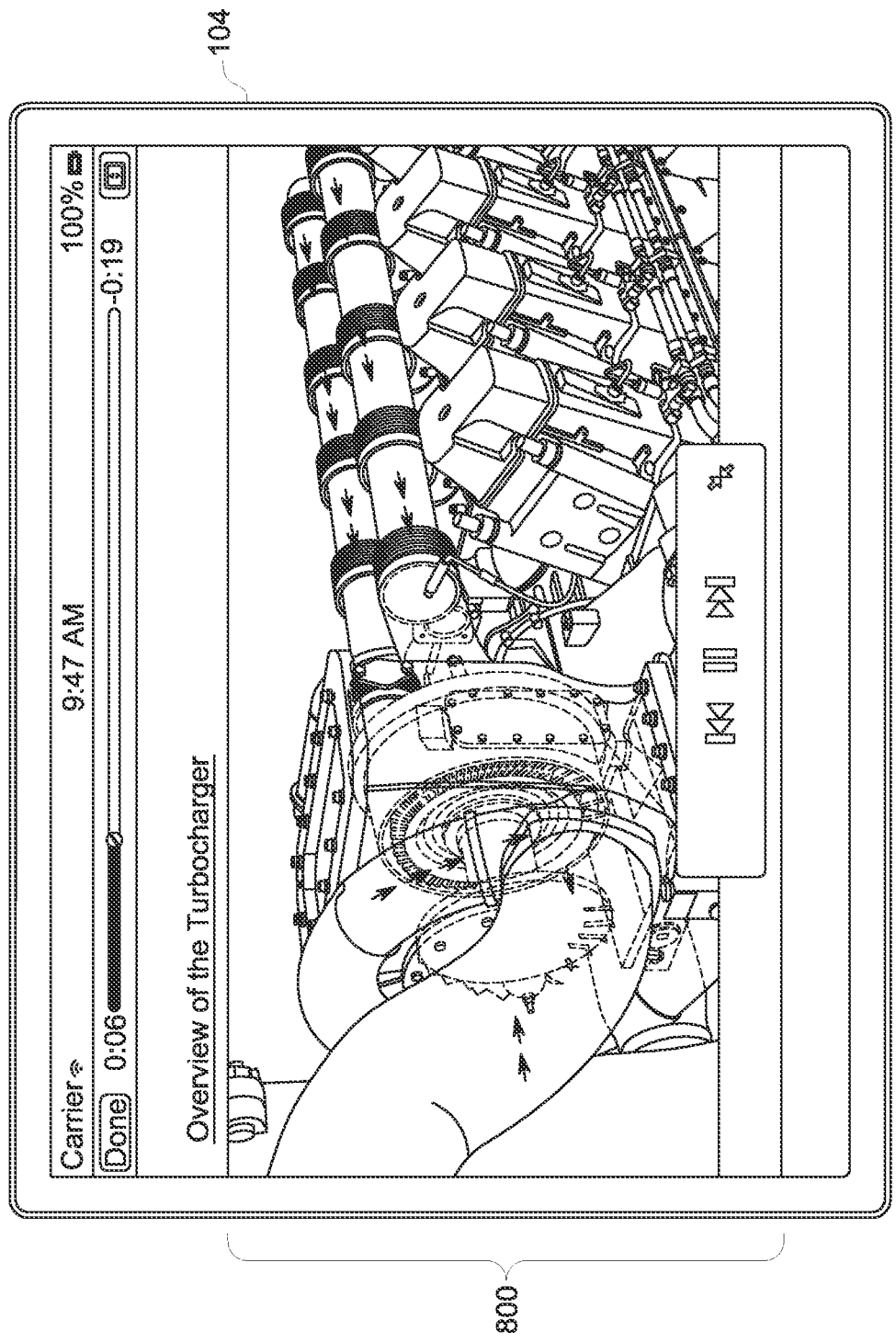
FIG. 8 illustrates an instructional representation of a component subsystem that can be displayed on the user device for an action of a recommended work scope.

FIG. 8 illustrates an instructional representation 800 of a component subsystem that can be displayed on the user device for an action of a recommended work scope. The instructional representation represents a video that can be displayed on the user device to demonstrate how the component subsystem (in this example, a turbocharger) is to operate, such as without an identified problem or fault being present. The user can control playback of the video so as to provide the user with a better understanding of how the component subsystem will work or is expected to perform once the recommended work scope has been successfully completed. Once the user has completed viewing of the video, the user can select the progression icon to advance to another action in the work scope or select another action as described above.

Figure 9:
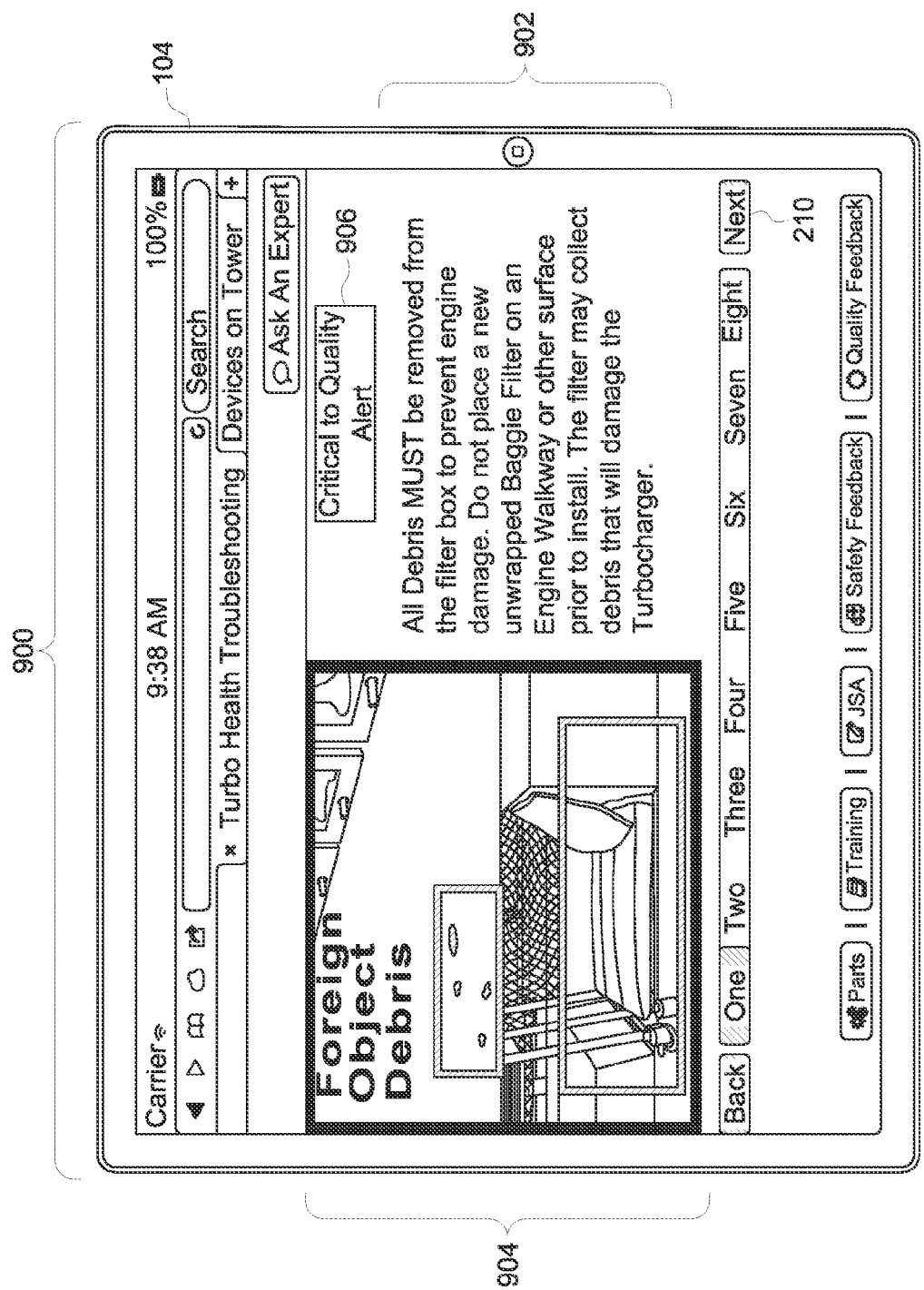
FIG. 9 illustrates an instructional representation of a component subsystem that can be displayed on the user device for the recommended work scope.

FIG. 9 illustrates an instructional representation 900 of a component subsystem that can be displayed on the user device for the recommended work scope. The instructional representation includes a combination of textual information 902 and non-textual information 904 that assists the user to perform one or more actions of the recommended work scope. Optionally, the instructional representation may only include textual information (e.g., similar to as shown in FIG. 5) or only non-textual information (e.g., only audio and/or video without text). The instructional representation may be referred to as a hybrid instructional representation as the representation includes both textual information and non-textual information.

In the illustrated example, the non-textual information includes images of warnings to prevent the user to avoid performing certain actions during performance of the recommended work scope. The textual information can include text that accompanies the images. For example, the top image illustrates a shop floor near where a filter (e.g., to be installed in the equipment during performance of the work scope) should not be placed. This image also includes an annotation that foreign object debris may be on this surface and a box illustrating such debris. The accompanying textual information similarly warns the user to not place the filter on a surface where such debris may be present, as shown in the top image. The bottom image illustrates a location where replacement components (e.g., a filter) may be obtained for use in performance of the work scope. Optionally, the information and/or may include a map or other representation of a shop or location where the work scope is being performed and/or instructions on where a needed component (e.g., the filter) is located in the shop on the map.

The user device can display an alert icon 906 (or other image) that informs the user of a relatively high level of importance for the corresponding action of the work scope. The icon may be referred to as a "critical to quality alert," but alternatively may represent another alert, as described herein. In the illustrated example, the icon is displayed to notify the user that the concurrently displayed action of the work scope has a higher priority or is more important to successful completion of the work scope. If the corresponding action is not performed or is only partially completed, then the repair or replacement being directed by the work scope may be more likely to be unsuccessful in fixing the problem or fault than if another, less important or lower priority action is not performed or is only partially completed.

Figure 10A:
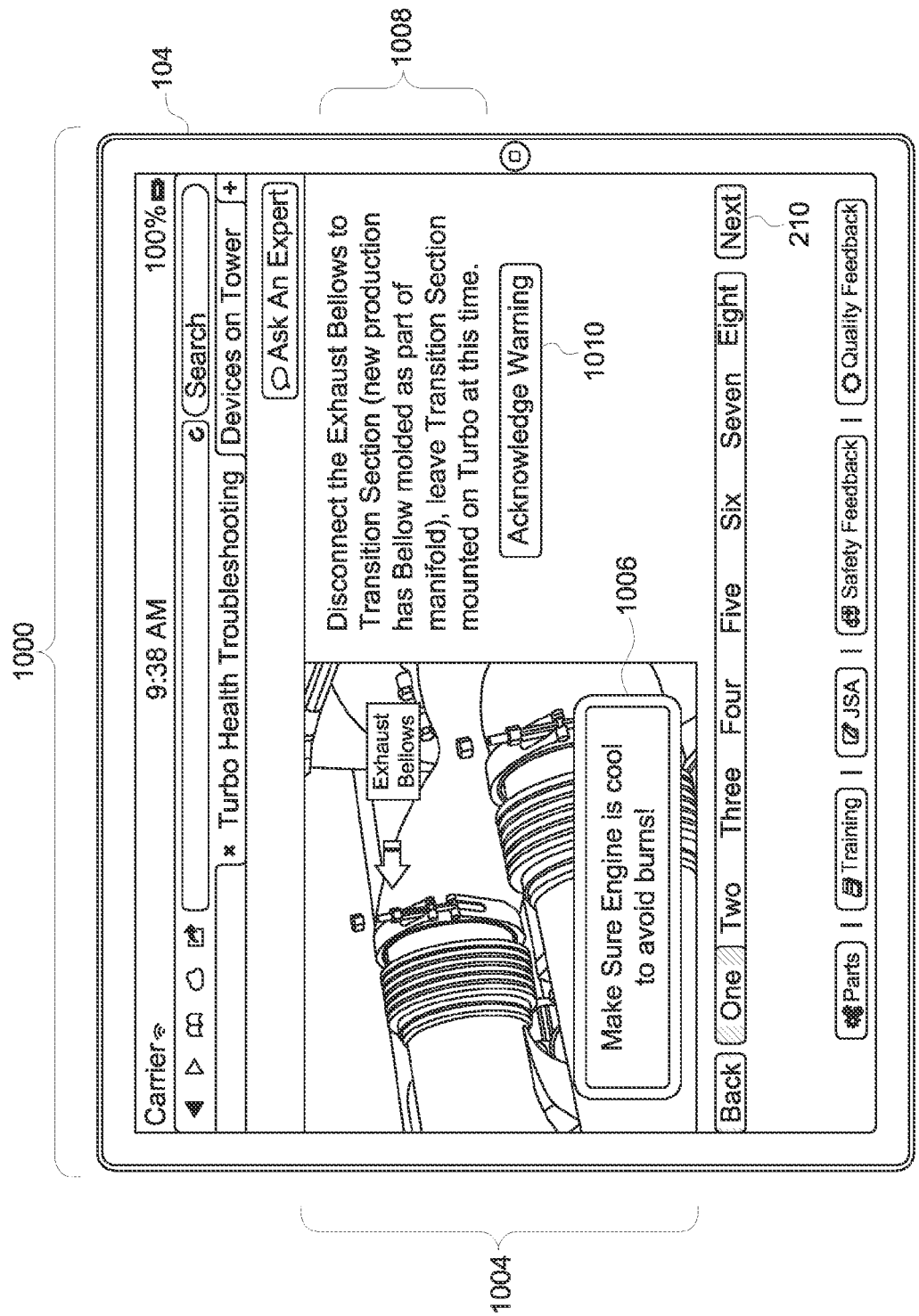
FIGS. 10A and 10B illustrate instructional representations of a component subsystem that can be displayed on the user device for the recommended work scope.
Figure 10B:

FIGS. 10A and 10B illustrate instructional representations 1000, 1002 of a component subsystem that can be displayed on the user device for the recommended work scope. The instructional representations include alerts for the user during performance of the work scope. In the illustrated example, the alert is a safety warning that notifies the user of a potentially dangerous action in the work scope. For example, an image 1004 shown in the first instructional representation illustrates the same part of the component and/or equipment being worked on during the recommended work scope, but in a different color. The image 1004 shown in the first instructional representation may be shown in a shade of red or another color to indicate that the part shown in the image may be at an elevated temperature (and unsafe to touch). Optionally, the image may be shown differently in another way, such as by using different types of lines, shading, or the like, to draw the attention of the user toward the image.

An alert 1006 shown in the first instructional representation may provide a written safety warning to accompany the image, such as by stating that the user should ensure that the illustrated part has cooled to a safe temperature. Additional text 1008 may instruct the user as to the action to be performed with the illustrated part. Although the alert is shown as a visual image, such as an icon, the alert may additionally or alternatively include an audible sound, a flashing image or text, video, an annotation on the image, or the like. In one aspect, the image may be annotated to represent the safety warning by the user device displaying one or more parts of the component subsystem that is shown in the image (but less than of the component subsystem) and that is associated with a hazardous condition in a color that is different from other parts of the component subsystem that are shown in the image and that are not associated with the hazardous condition.

An additional or alternative alert may include one or more alert icons or watermarks displayed by the user device, such as in a corner or other location of the display. These alert icons can indicate a hazard class (e.g., electrocution, impact, asphyxiation, cutting, toxicity, heat, or the like) associated with the displayed action to be performed in the work scope. The different hazard classes may be associated with different respective icons such that the alert icon or watermark may clearly illustrate the various risks associated with performance of the action in the work scope.

In one embodiment, the one or more selected hazards that may be associated with the action may be pulled from a library of hazards, each having a corresponding icon. The icon, based on the hazard, may be dynamically assigned to the action based on characteristics of the action. That is, the action need not be hard-coded to include one or more icons. Rather, characteristics of the action assign the icon. This may obviate the need to update all action/alert pairings for a change or update. In practice, this may be implemented so that an action with the word "wire" may pull an icon or text for a shock hazard and that an electrical lock-out needed. An action with the word "exhaust" may pull an icon or text for burn hazard and that ventilation or breathing equipment is required. These trigger words may be in the form of text, audio/video content, or the display of identified components. That is, when the display is showing wiring, that can trigger the simultaneous display of the alert.

To provide adequate safeguards to ensure that the user actually sees the safety warning, the user device may display an alert acknowledgement icon 1010. In one aspect, the user may be required by the user device to select this icon before proceeding in the recommended work scope. For example, the user device may ignore any selection of the progression icon and therefore prevent advancing in the work scope unless and until the user selects the alert acknowledgement icon.

The instructional representations shown on the user device may change once the user acknowledges the alert, such as by selecting the alert acknowledgement icon. For example, the color of the part shown in the image may change from red (or another color) in the instructional representation to a blue (or another, different color) in the subsequent instructional representation. The user may perform the action described in the instructional representations and now be allowed to select the progression icon to advance to a subsequent action in the recommended work scope.

Optionally, the alert that is presented to the user on the user device may communicate information to the user other than a safety warning. As one example, the alert may include a productivity loss warning. Such as warning can notify the user of a productivity loss that may occur if the action to be performed in accordance with the work scope is performed at that time. For example, if the action instructed by an instructional representation on the user device would involve the use of a resource that is currently unavailable, the alert may warn the user that performing this action at the current time may require the user waiting for the tool or other equipment to become available for his or her use. This resource can include a replacement part that is needed to complete the recommended work scope, a particular tool or other equipment that is used to perform the action, a technician that is particularly skilled in performing the action, a remaining amount of available working hours for a technician or the user to perform the action (e.g., where the technician and/or user is limited on the total number of working hours, such as in a work day), or the like.

The acknowledgement icon that accompanies such an alert may provide the user with an option to skip the action in the work scope that is associated with the alert, proceed to another action, and return to the present action at another time. Selecting the icon may then cause the work scope as presented on the user device to proceed to the other action. For example, the user may choose to perform the action at a later time, when a needed tool or other equipment is available, a skilled technician is available, the user and/or technician has more time to perform the action, a replacement part is available, or the like.

The analysis system and/or user device can refer to the resources to determine when to present such a productivity loss alert to the user on the user device. For example, one or more of the resources may represent a part needed to complete one or more actions of the recommended work scope. The memory device can maintain an inventory log of parts used in the repair and/or replacement of various component subsystems and/or equipment. When a recommended work scope is identified by the analysis system and/or the user device based on the identification information (as described above), the analysis system and/or user device can determine if performance of the recommended work scope involves the replacement of one or more parts of the component subsystem and/or replacement of the component subsystem.

The analysis system and/or user device may then refer to the inventory log to determine if there are sufficient parts to perform the recommended work scope. If not, the analysis system and/or the user device may cause the productivity loss alert to be displayed to warn the user of the lack of available parts to complete the recommended work scope.

In one aspect, separate inventory logs may be maintained in the memory device(s) 112 for different locations. For example, a first inventory log may represent how many parts are in a first repair shop, a second inventory log may represent how many parts are in a different, second repair shop that is remote from the first repair shop (e.g., not in the same location or connected to the first repair shop), and so on. If the user device is disposed in or near the first repair shop (which may be determined by location information obtained by the user device, such as from a Global Positioning System (GPS) receiver, triangulation from wireless signals, user input, or the like), then the user device and/or the analysis system may refer to the first inventory log to determine if a part needed for performance of an action in the recommended work scope is available at the first repair shop. If not, then the user device and/or analysis system may provide the productivity loss alert to inform the user that a needed part is not locally available.

The user device and/or analysis system may then present the user with information about availability of the needed part in another location using the inventory logs. For example, the user device and/or analysis system may determine if the part is available in another location and display a map, list, or other representation on the user device that notifies the user of where the part is available, how far the part is from the current location of the user device, how long it can take to deliver the part to the current location of the user device, and so on. In this way, the user can make an informed decision of how to proceed (e.g., wait for the inventory of parts to be replenished at the current location, wait for the needed part to be delivered from another location, skip the action in the recommended work scope that involves the part, and so on) in light of the part being unavailable at the current location. In one aspect, the user device can allow the user to place an order for the part to be purchased and/or delivered from another location, such as by presenting the acknowledgement icon 1010 that can be selected to order the part (or by providing other input via the input device).

In one aspect, a resource 106 can represent a particular tool or other equipment that is used to perform an action of the recommended work scope. By way of example, a mechanical lift or jack may be needed to lift a heavy object (e.g., an engine), an electric sensor may be needed to monitor output of the component subsystem, a machine may be needed to cut one or more parts of the equipment and/or component subsystem, a machine may be needed to combine (e.g., weld) one or more parts of the equipment and/or component subsystem, or the like.

If the tool or equipment used to perform the action in the work scope is currently unavailable at the location of the user device, the productivity loss alert may be displayed to warn the user of the unavailability of the tool or equipment. The acknowledgement icon that accompanies such an alert may provide the user with an option to skip the action in the work scope that is associated with the alert, proceed to another action, and return to the present action at another time. Selecting the icon may then cause the work scope as presented on the user device to proceed to the other action. For example, the user may choose to perform the action at a later time, such as when the tool or equipment is available.

The analysis system and/or user device can refer to the resources to determine when to present such a productivity loss alert to the user on the user device. For example, one or more of the resources may represent the tool or equipment that is needed to complete one or more actions of the recommended work scope. The memory device can maintain an inventory log of the tools and equipment used in the repair and/or replacement of various component subsystems and/or equipment. When a recommended work scope is identified by the analysis system and/or the user device based on the identification information (as described above), the analysis system and/or user device can determine if performance of the recommended work scope involves the use of one or more tools or other equipment.

The analysis system and/or user device may then refer to the inventory log to determine if the needed tool or equipment is located at or near the location of the user device (and/or the equipment and/or component subsystem being worked on). If not, the analysis system and/or the user device may cause the productivity loss alert to be displayed to warn the user of the lack of available tools or equipment. In one aspect, the inventory log may maintain a reservation system that tracks when the tool or equipment will be available in the future and/or when the tool or equipment is expected to be available.

In one aspect, separate inventory logs may be maintained in the memory device(s) for different locations, similar to as described above in connection with the inventory logs of parts. If the needed tool or equipment is not available, then the user device and/or analysis system may determine when the tool or equipment is expected to be available next (e.g., from the inventory log for the location of the user device). If the tool or equipment is available in another location, the user device and/or analysis system may display a map, list, or other representation on the user device that notifies the user of where the tool or equipment is available, how far the tool or equipment is from the current location of the user device, how long it can take to deliver the tool or equipment to the current location of the user device, and so on. In this way, the user may make an informed decision of how to proceed (e.g., wait for the tool or equipment to be available at the current location, wait for the tool or part to be delivered from another location, skip the action in the recommended work scope that involves use of the tool or equipment, and so on) in light of the part being unavailable at the current location. In one aspect, the user device can display the acknowledgement icon to allow the user to reserve the tool or equipment and/or have the tool or equipment delivered to a desired location. For example, the tool or equipment may be reserved at a later time to prevent others from using the tool or equipment and/or may be scheduled to be delivered to the location of the user device by selecting the acknowledgement icon (or providing other input).

Another example of a productivity loss alert may be an alert that is presented on the display device to notify the user that a technician that is skilled in performing the action of the recommended work scope is unavailable to perform the action. The acknowledgement icon that accompanies such an alert may provide the user with an option to skip the action in the work scope that is associated with the alert, proceed to another action, and return to the present action at another time, as described above.

The analysis system and/or user device can refer to the resources to determine when to present such a productivity loss alert to the user on the user device. For example, one or more of the resources may represent a skilled technician that is needed to complete one or more actions of the recommended work scope. The memory device can maintain an attendance log of technicians available to perform various tasks to complete the work scope. The attendance log can represent locations of various technicians, current states of the technicians (e.g., working on another task, available to assist on a task, not present at the current location, and the like), available working hours remaining for the technicians (e.g., the number of hours left in the current day that the technicians can work), and the like.

When a recommended work scope is identified, the analysis system and/or user device can determine if performance of the recommended work scope involves the work of a skilled technician other than the user of the user device. The analysis system and/or user device may then refer to the attendance log to determine if a needed technician is available to perform the recommended work scope. If not, the analysis system and/or the user device may cause the productivity loss alert to be displayed to warn the user of the lack of an available technician to complete the recommended work scope.

In one aspect, separate attendance logs may be maintained in the memory device(s) 112 for different locations, similar to as described above for the inventory logs. These different attendance logs may be used to determine and notify (e.g., using the alert) the user if a technician is unavailable at the location of the user device. The user device and/or analysis system may then present the user with information about availability of another technician that can perform the needed task in another location. The user device and/or analysis system may determine if the technician is available in another location and display a map, list, or other representation on the user device that notifies the user of where the technician is available, how far the technician is from the current location of the user device, how long it can take to deliver the technician to the current location of the user device, and so on. In this way, the user can make an informed decision of how to proceed (e.g., wait for the technician at the current location to be available, wait for the technician to arrive from another location, skip the action in the recommended work scope that involves the technician, and so on).

Another example of a productivity loss alert may be an alert that is presented on the display device to notify the user that a remaining amount of available time for a technician or the user to perform the action is so limited that the action cannot be completed at the current time. For example, some actions in the recommended work scope may involve a relatively long time to complete. The hours that technicians and/or the users may work in a day, week, month, year, or other time span may be limited by contract, regulation, law, or the like. The available hours that the technicians and/or user can work may be tracked and saved in working logs stored at the memory device. The user device and/or analysis system can examine the recommended work scope and the working logs to determine if the work scope involves an action that may not be completed within a designated time period (e.g., within the same day, shift, eight hour period, or the like, as when the work scope begins). If the action and/or work scope cannot be completed within the designated time period due to limitations on the available working hours of the technician and/or user, then the user device can display the productivity loss alert to the user. Similar to as described above in connection with the availability of a skilled technician, the user device can notify the user if another technician and/or user is available in another location so that the user of the user device can schedule the technician or other user to perform the action (e.g., at the location of the user device or at another location).

Another alert that can be displayed by the user device includes a financial cost alert. This alert can warn a user when performance of an action in the recommended work scope exceeds some designated and/or non-zero threshold cost. For example, some actions in a recommended work scope may involve the use of relatively expensive parts, tools (e.g., in terms of cost of wear and tear on the tools, rental fees, or the like), fuels, or other materials. The analysis system and/or user device can examine the recommended work scope to determine if performance of one or more of the actions would cost more than a designated threshold cost, such as a user-established budget. If so, the analysis system and/or user device can cause the financial cost alert to be displayed to notify the user. The user may then choose not to perform the action, to perform or select another work scope, or proceed with the recommended work scope in light of the relatively expensive cost of doing so.

In addition or as an alternate to the options provided by the acknowledgement icon described above, the user device and/or analysis system may present the icon so that selection of the icon causes another recommended work scope to be selected by the user. For example, a first recommended work scope may be selected based on identification information received via the user device (as described above). If an alert is presented to the user, the user may select the alert so that the first recommended work scope is terminated, and a different, second recommended work scope is selected and used. In doing so, the user may avoid alerts being presented during performance of the second recommended work scope.

Another example of the alert may be an estimated time to failure alert. This alert may notify the user of a time that the component subsystem and/or equipment may continue to be used before failure of the component subsystem and/or equipment is expected to occur. The component subsystem and/or equipment may be considered to have failed when performance or operations of the subsystem and/or equipment terminate or fall below a designated output threshold. For example, an engine may fail when less than a designated amount of threshold horsepower is generated by the engine, a turbocharger may fail when the pressure differential created by the turbocharger falls below a threshold, a motor may fail when the torque created by the motor falls below a threshold, and so on.

In one aspect, the estimated time to failure for a component subsystem and/or equipment may be based on empirically derived times to failure for other similar subsystems and/or equipment. For example, the memory device may store the actual times to failure for other subsystems and/or equipment that is similar to the subsystem and/or equipment under examination, where the other subsystems and/or equipment are the same or similar type of subsystems and/or equipment, are the same or similar age, have the same or similar outputs, and the like. These actual times to failure may be used to estimate the time to failure for the subsystem and/or equipment under examination. Optionally, the estimated time to failure for the component subsystem and/or equipment may be determined from a history of previous faults of the same subsystem and/or same equipment.

During and/or subsequent to performance of a work scope, the user device can allow the user to provide feedback to the analysis system via the user device. This feedback may notify the analysis system and/or one or more resources (e.g., a person who designs and/or modifies the work scopes) of problems with the work scope and/or potential ways to improve the work scope.

As one example, the user feedback may include an inefficiency notice or efficiency notice. Such a notice is used to inform the analysis system and/or one or more resources that one or more actions of the work scope (or the entire work scope) can be performed more efficiently. For example, the user may determine that changing the order of the actions in the work scope, removing one or more of the actions, performing one or more of the actions in a different way, or the like, can achieve completion of a goal of the work scope (e.g., repair or replacement of the component subsystem and/or equipment) faster than the current actions in the work scope.

Another example of user feedback is a safety notice. This notice can inform the analysis system and/or one or more resources that performance of one or more of the actions in the work scope is unsafe and/or presents a hazard to the user. For example, the work scope may direct the user to touch a part of the component subsystem and/or equipment when the part is too hot to safely touch, is charged with an electric current, or is otherwise unsafe. The user can provide the safety notice through the user device to warn of this unsafe situation.

Another example of user feedback is an inoperability notice. This notice can inform the analysis system and/or one or more resources that one or more actions in the work scope does not result in completion of the work scope. For example, an action in the work scope may direct the user to detach a first part from the component subsystem before a second part is removed from the subsystem. But, due to the manner in which these parts are connected to the component subsystem, the user may not be able to detach the first part until the second part is removed. As another example, the manner in which the work scope directs the user to remove or connect parts of the component subsystem may be incorrect. The user can input information about such errors in the work scope into the user device as inoperability notices.

Figure 11:
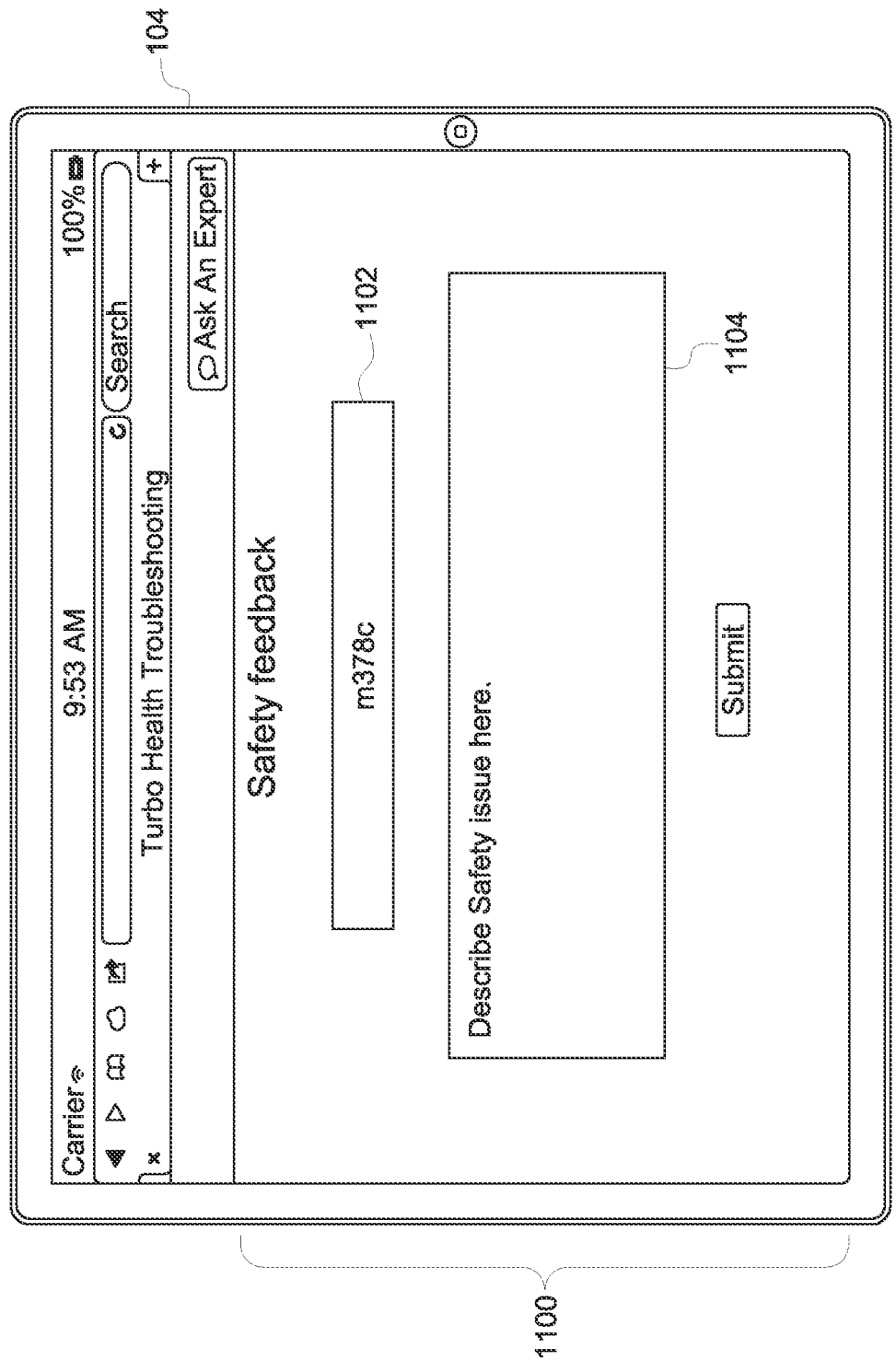
FIG. 11 illustrates another example of a user interface displayed by the user devices.

FIG. 11 illustrates another example of a user interface 1100 displayed by the user devices. The user interface may be displayed to the user so that the user can provide user feedback to the analysis system and/or resources using the user device. As described above, this user feedback can include inefficiency notices, safety notices, inoperability notices, or other information. While the user interface states "Safety Feedback," another type of feedback can be provided instead of, or in addition to, a safety notice.

The user interface may include windows for the user to type a written description of the user feedback. Optionally, the user may draw on or otherwise annotate an image for the user feedback. For example, the user device may include a camera or may receive an image of the component subsystem, the equipment, or a portion thereof. The user may then draw on the image (e.g., using the touchscreen of the user device, a stylus, an electronic mouse, and the like) to identify the locations in the image where the user feedback relates. As one example, in a safety notice, the user may encircle a section on the image that indicates a sharp, hot, electrically charged, or otherwise unsafe part of the subsystem and/or equipment. The user may also type or record a description of the safety issue using the user device. The safety notice may then be communicated to the analysis system and/or resources.

Figure 12:
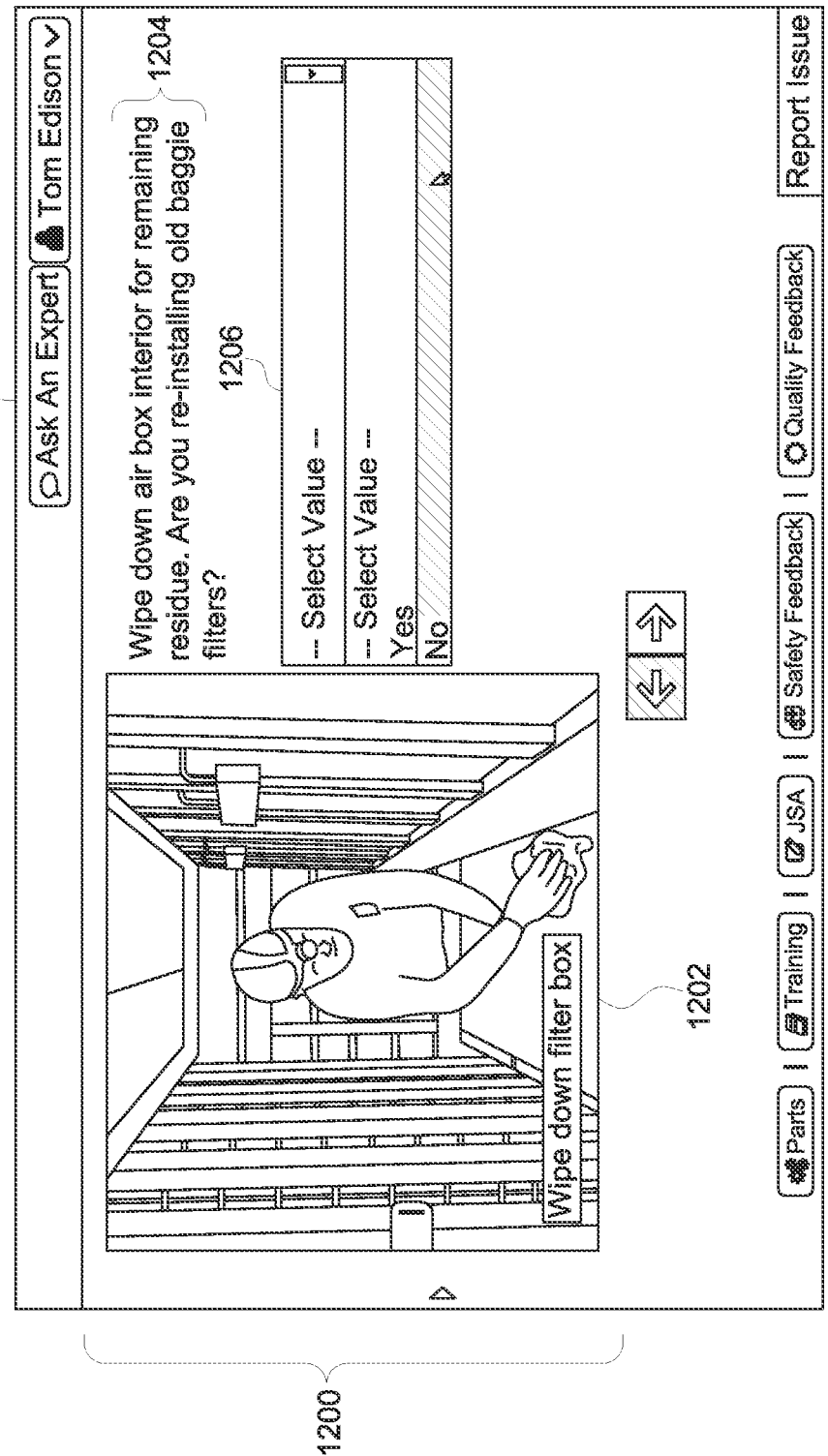
FIG. 12 illustrates another example of a user interface that can be presented to the user on the user device.

FIG. 12 illustrates another example of a user interface 1200 that can be presented to the user on the user device. The user interface may direct the user to perform an action from a work scope that examines a component subsystem and/or equipment, such as when a troubleshooting work scope is selected by the user. Optionally, the user interface may be displayed to guide the user to perform an action from an outbound checkup work scope. For example, the action directed by the user interface may direct the user to check one or more operations, aspects, appearances, or the like, of the equipment and/or component subsystem that was examined, maintained, or otherwise repaired prior to releasing the equipment and/or component subsystem for use.

The user interface can display an image 1202 (e.g., a still image and/or a video) and/or text 1204 to query the user on one or more aspects of the component subsystem and/or equipment. For example, the image and/or text may request that the user confirm performance of an action and/or visually inspect, measure, operate, or otherwise examine the component subsystem and/or equipment. The user interface shown in FIG. 12 includes a response window 1206 that allows the user to provide user input to respond to the query provided by the image and/or text. The illustrated response window allows the user to select a "Yes" or "No" response to the query, but additionally or alternatively may allow for the user to provide other responsive input, such as an alpha-numeric text string, image, sensor data, or the like.

The user input provided by the user can be received by the user device and used to determine if the recommended work scope for the component subsystem and/or equipment was successfully completed. The analysis system may compare the user input provided via the user device (and/or other information, such as sensor data representative of operations of the component subsystem and/or equipment) with designated responses or data representative of successful completion of the work scope.

If the user input does not match the designated responses or data by at least a threshold, non-zero amount, then the analysis system may determine that the work scope was not completed, or was not successfully completed. For example, if the user input indicates that a surface of a filter was not cleaned during the work scope (as opposed to the filter being cleaned), that an old bag of a filter was reused (instead replacing the filter bag), that the horsepower generated by an engine is less than a designated threshold, that the pressure boost of a turbocharger is less than a designated pressure boost, or the like, then the analysis system may determine that the work scope was not successfully completed. The analysis system can direct the user device to inform the user and recommend that the work scope be repeated, that one or more of the actions in the previously completed work scope be repeated, that one or more additional actions be performed, or that another work scope be performed.

If the user input does match the designated responses or data by at least a threshold, non-zero amount, then the analysis system may determine that the work scope was successfully completed. For example, if at least a designated percentage of the answers provided by the user match or otherwise correspond to designated answers representative of successful completion of the work scope, then the analysis system may determine that the work scope 102 was successfully completed. The analysis system can direct the user device to inform the user and recommend that the component subsystem and/or equipment be used when available.

Figure 13:
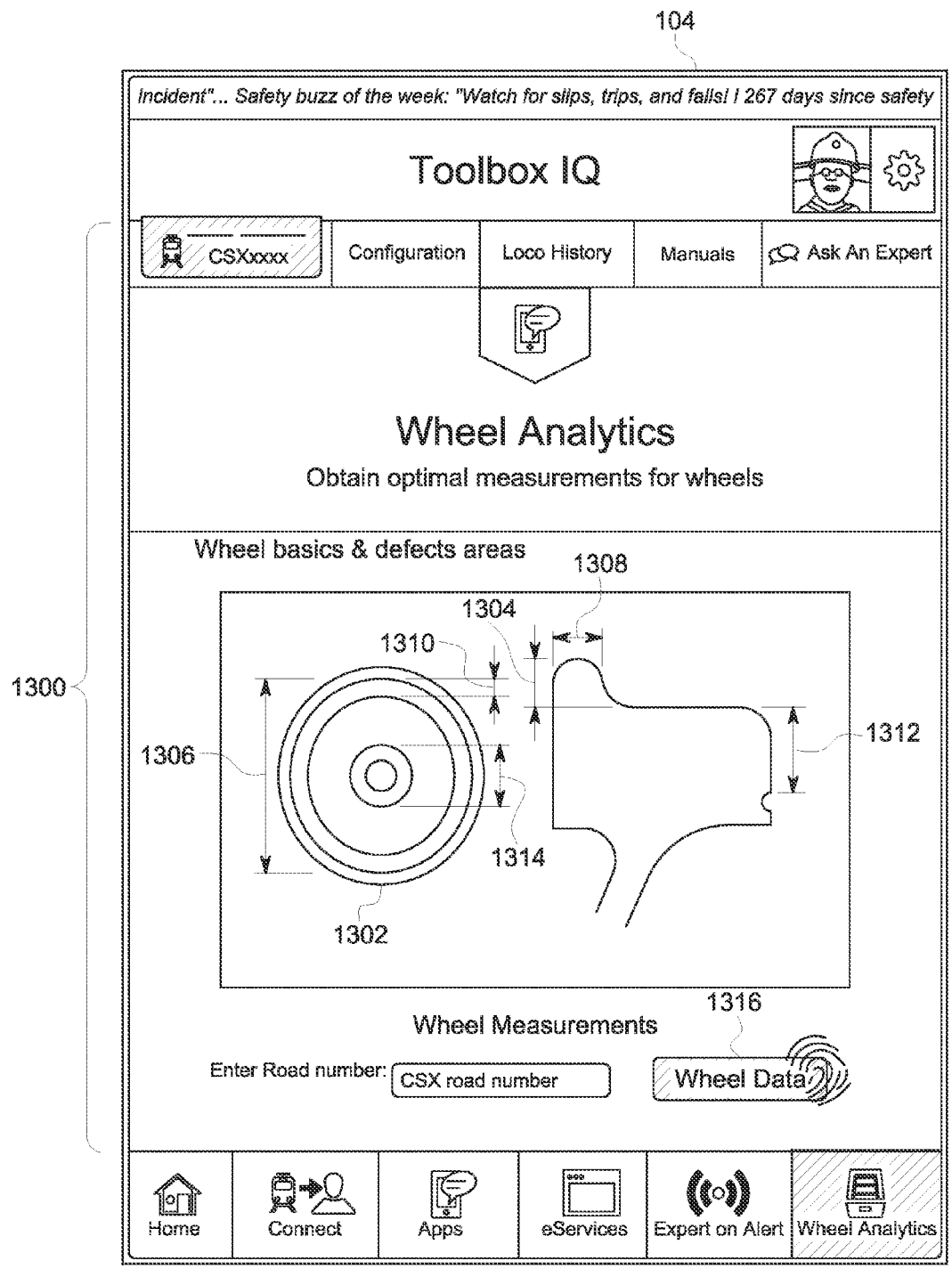
FIGS. 13 through 15 illustrate an example of user interfaces shown on the user device during an example of a recommended work scope.
Figure 14:
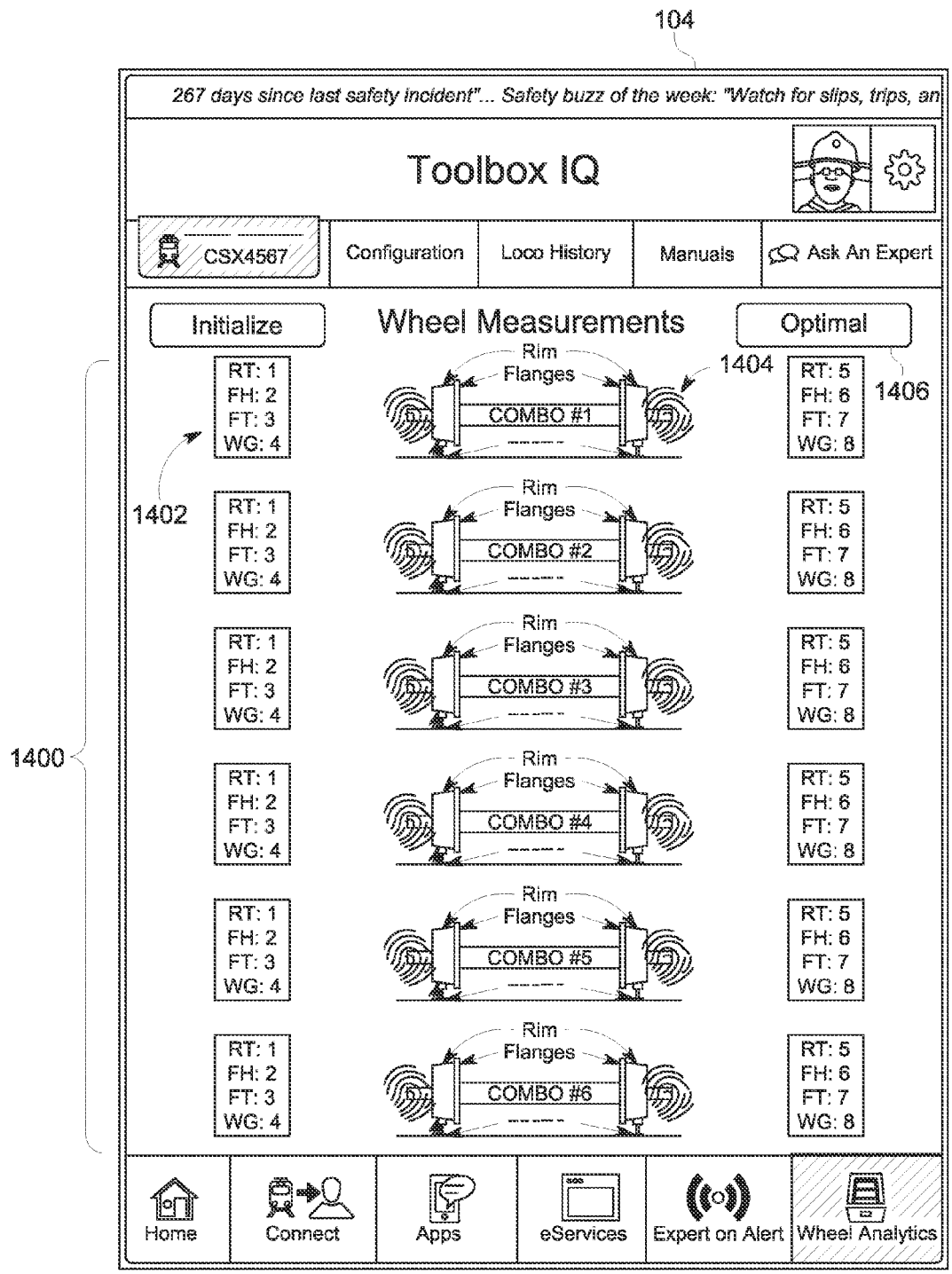
Figure 15:
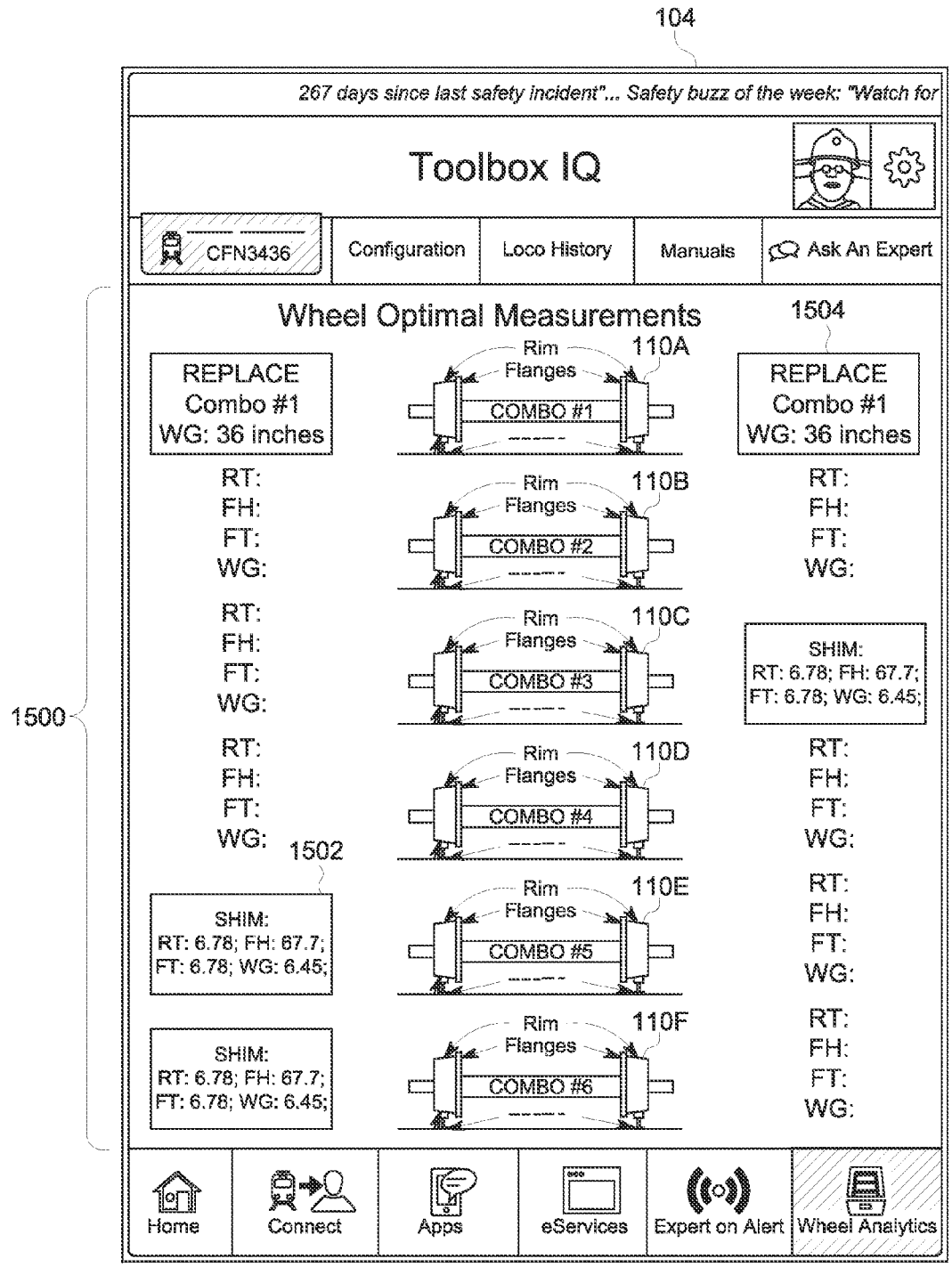

FIGS. 13 through 15 illustrate an example of user interfaces 1300, 1400, 1500 shown on the user device during an example of a recommended work scope. The work scope described in connection with these user interfaces 1300, 1400, 1500 can be used to measure dimensions of a wheel, determine if the dimensions need to be changed and/or if the wheel needs to be replaced, and to locate a replacement wheel. Not all embodiments of the subject matter described in connection with FIGS. 13-15 are limited to wheels, however. The subject matter described herein may be used for the examination of one or more other component subsystems of equipment, the determination of whether to alter or replace the component subsystems, and/or the locating of a replacement component subsystem other than a wheel.

The user device can present a user interface that instructs the user how to measure or otherwise determine one or more characteristics of a component (e.g., a component subsystem) of equipment. The user interface shown in FIG. 13 instructs the user how to measure various dimensions of a wheel 1302 of a rail vehicle. Alternatively, the user interface may instruct the user to measure, sample, or otherwise determine one or more other characteristics, such as temperature, speed, electric current, horsepower, force, friction, or the like. The user interface identifies dimensions of the wheel that are to be measured, such as a flange height 1304, a diameter dimension 1306, a flange thickness 1308, a rim dimension 1310, a distance from a witness groove 1312, a hub dimension 1314, and the like. These dimensions 1304, 1306, 1308, 1310, 1312, 1314 represent characteristics of the wheel that may be measured by the user. The user can measure some or all of these dimensions and input the dimensions into the user device, such as by selecting a data input icon 1316 and typing in or otherwise inputting the dimensions. Optionally, the characteristics that are input may be other characteristics, such as a power output of a motor (e.g., horsepower), current generated by an engine and generator set, the amount and/or type of emissions generated by an engine, the exhaust pressure and/or pressure boost from a turbocharger, fluid pressure and/or flow in a braking system (e.g., air pressure in an air brake system), and the like.

FIG. 14 is another example of a user interface 1400 that can be displayed on the user device. The user interface 1400 visually presents input characteristics 1402 of the component subsystem (and/or equipment). In the illustrated example, the user interface displays the wheel dimensions that were input by the user of the device as the input characteristics. Optionally, one or more other characteristics may be input, as described above.

In one aspect, the user may input the characteristics by selecting (e.g., touching, "clicking," or the like) an icon or image 1404 of the component subsystem (and/or equipment). The illustrated example shows several images of axle and wheel sets for a rail vehicle, such as a locomotive. The number of images may correspond to the number of axle and wheel sets in the rail vehicle. Optionally, a different number, icon, and/or image may be used. The user may select one side (e.g., the left side) of the image for a first component subsystem (e.g., a first axle wheel set) to input the actual dimensions of one wheel and select the other side (e.g., the right side) of the image 1404 for the same first component subsystem to input the actual dimensions of the other wheel in the first component subsystem. The user may progress through the other images to input additional dimensions for the other axle and wheel sets.

Additionally or alternatively, one or more of the input characteristics may be automatically uploaded into the user device. For example, one or more sensors, transponders, or the like, may automatically communicate the input characteristics (such as speed, temperature, pressure, flow rate, dimensions, or the like) to the user device. The user device may populate the user interface with the input characteristics.

The user device can display a comparison icon 1406 that, if selected by the user, causes the actual characteristics to be compared to one or more designated characteristics. For example, once the actual characteristics are input into the user device, the comparison icon may be selected to cause the actual dimensions of the wheels to be compared to corresponding designated characteristics of the wheels. The designated characteristics may represent desired or acceptable values of the characteristics of the component subsystem (and/or equipment). With respect to wheels, for example, the designated characteristics may represent dimensional tolerances, or ranges or limits on the sizes of the dimensions of the wheels.

The analysis system may receive the actual characteristics from the user device and compare the actual characteristics to the designated characteristics (e.g., stored in the memory device). Optionally, the user device and/or one or more of the resources may compare the actual and designated characteristics. Differences between the actual and designated characteristics may be identified. If one or more differences between the actual characteristics (e.g., wheel dimensions) and the designated characteristics (e.g., wheel dimensions that are acceptable for safe travel and/or satisfy one or more rules or regulatory requirements) is relatively large (e.g., exceeds a threshold), then the analysis system (and/or the user device, the resources, and so on) may notify the user of these differences.

FIG. 15 is another example of a user interface 1500 that can be displayed on the user device. The user interface presents the comparisons between the actual and designated characteristics of the component subsystem (and/or equipment) that is under examination by the user of the device. The user interface also or alternatively can present recommendations for the component subsystem (and/or equipment).

The comparisons and/or recommendations may be represented or identified by analysis icons 1502, 1504. These icons can represent recommended changes to the component subsystems (and/or equipment) under examination. Optionally, the icons represent the differences between the actual and designated characteristics.

In the illustrated example, the user interface presents the icons to recommend changing the dimensions of the wheels and/or to replace the wheels. The analysis system (and/or the user device and/or one or more resources) may compare the differences between the actual and designated characteristics to one or more thresholds, which can be stored in the memory device. If the differences exceed a first threshold, then the analysis system (and/or the user device and/or one or more resources) may determine that a responsive action needs to be taken, such as by repairing or replacing the component subsystem. If the differences exceed the first threshold, but not a larger, second threshold, then the analysis system (and/or the user device and/or one or more resources) can recommend repairing the component subsystem. In the illustrated example, such a repair may occur by changing the dimensions of the wheel (e.g., cutting or otherwise removing part of the wheel) so that the differences between the actual and designated characteristics no longer exceed the first threshold. If the differences exceed both the first and second thresholds, then the analysis system (and/or the user device and/or one or more resources) can recommend replacing the component subsystem, such as by replacing one or more wheels in the axle and wheel set or the entire axle and wheel set.

In the illustrated example, for a first component subsystemA (e.g., the first axle and wheel set), the icons recommend replacing both wheels of the subsystemA. The differences between the actual and designated wheel dimensions are sufficiently large such that the analysis system (and/or the user device and/or one or more of the resources) recommends replacing the component subsystemA.

For second and fourth component subsystemsB, 110D (e.g., a second and fourth axle and wheel set), no recommendations or differences are presented. For example, the differences between the actual and designated wheel dimensions of the second and fourth component subsystemsB are sufficiently small that the analysis system (and/or the user device and/or one or more of the resources) does not recommend changing the dimensions or replacing any wheels.

For third, fifth, and sixth component subsystemsC, 110E, 110F (e.g., a third, fifth, and sixth axle and wheel set), the differences between the actual and designated wheel dimensions are sufficiently large such that the analysis system (and/or the user device and/or one or more of the resources) recommends changing the dimensions of one or more wheels, but not replacing any wheels. For example, the differences between the actual and designated wheel dimensions of the component subsystemsC may be sufficiently large that the dimensions need to be changed, but also are sufficiently small that the wheels do not need to be replaced. The icons can provide recommended changes to the component subsystemsC, such as by providing recommended changes to the actual dimensions of the wheels.

Responsive to the analysis system (and/or the user device and/or the resources) identifying the recommended changes and the user device presenting these recommended changes to the user, the user may alter the dimensions of the wheels accordingly. In one aspect, the user device may present a recommended work scope having a series of actions that guide the user through modification of the dimensions of the wheels, similar to as described above.

Additionally or alternatively, the user device may present the user with replacement parts or component subsystems for replacing (instead of repairing) the component subsystems. For example, instead of modifying the dimensions of the wheels in the component subsystemsC shown in FIG. 15, the user device may list or otherwise display replacement wheels for replacing these wheels (in addition to the replacement wheels for the component subsystemA).

Figure 16:
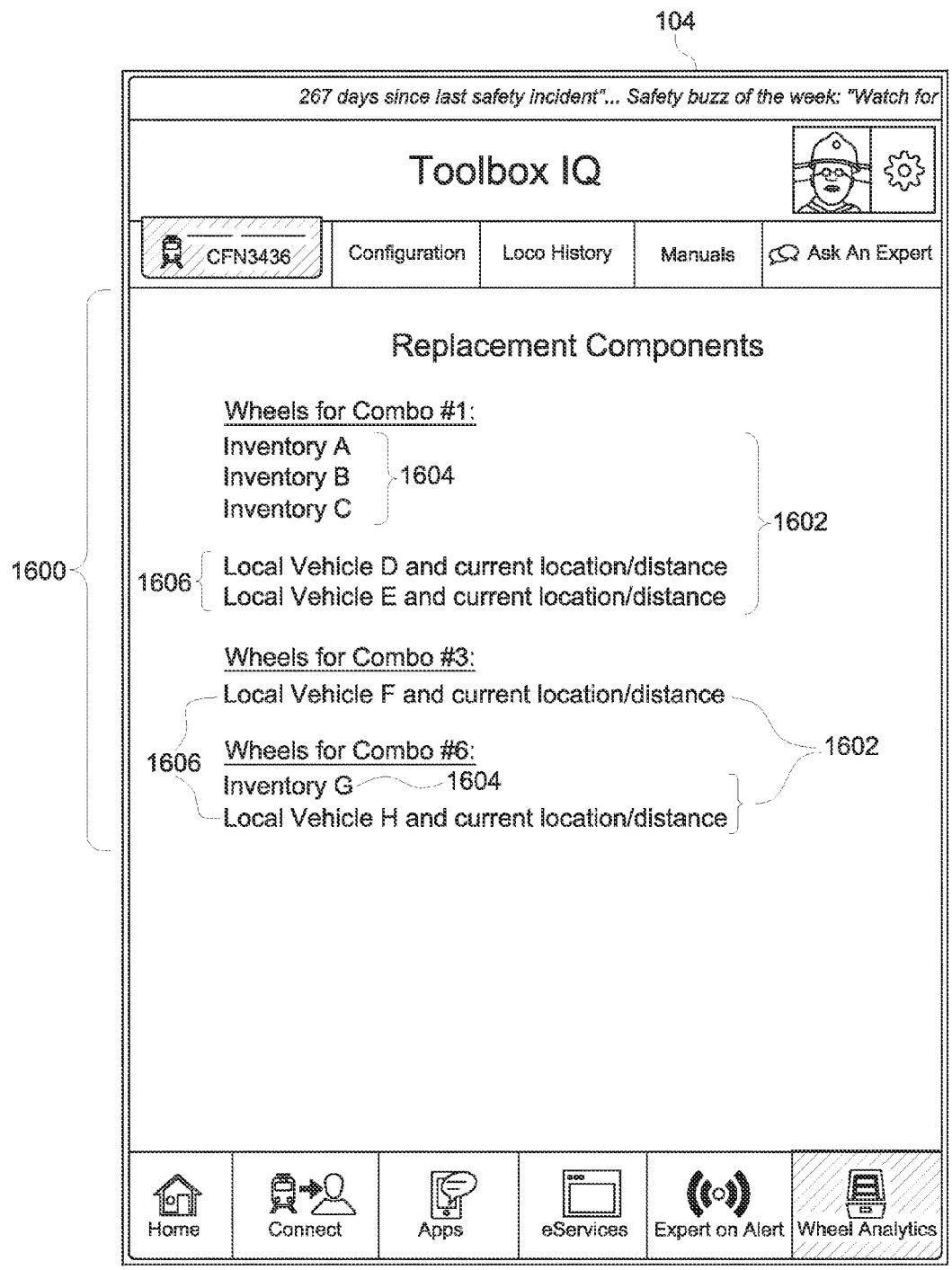
FIG. 16 illustrates another example of a user interface that can be displayed on the user device.

FIG. 16 illustrates another example of a user interface 1600 that can be displayed on the user device. The user interface presents the user with options for replacing parts of the component subsystems. For example, the user interface lists replacement parts 1602 (e.g., wheels) that may be used to replace parts of the component subsystemsA, 110C, 110F. While the description herein focuses on replacement wheels, not all embodiments of the inventive subject matter are limited to wheels. For example, one or more embodiments may relate to other parts, such as replacement filters, motors, engines, trucks, rail cars, turbochargers, pumps, or the like.

In order to identify the replacement parts 1602, the analysis system (and/or the user device and/or the resources) may examine a list, table, database, or other memory structure stored in the memory device that includes a set of replacement parts. This set may include characteristics of the replacement parts, such as the actual dimensions of wheels. The analysis system can determine if one or more of these replacement parts have characteristics (e.g., dimensions) that are within designated characteristics. For example, the analysis system can determine if the dimensions of one or more replacement wheels in a spiker pool are within designated ranges of dimensions identified as being acceptable for use with a vehicle, such as a locomotive.

Additionally or alternatively, the analysis system can determine if the characteristics of the replacement parts more closely match the measured characteristics of the component subsystems. With respect to axle and wheel sets, if the analysis system determines that one wheel of the set needs to be replaced, the analysis system may search for a replacement wheel that has dimensions that are closer to the wheel that remains in the set (e.g., that is not being replaced) than one or more other replacement wheels.

The replacement parts may include inventory stock parts 1604 that are obtained from an inventory stock (e.g., a spiker pool) of replacement parts. Such an inventory stock represents a group of parts that is not currently being used and is available for replacing one or more parts in the component subsystem and/or equipment. The inventory stock parts in the inventory stock are not currently being used in operation by another component subsystem and/or equipment.

Additionally or alternatively, one or more of the replacement parts may be currently used parts 1606. The currently used parts are being used in operation of one or more other component subsystems and/or equipment. For example, a replacement wheel for an axle and wheel set of a first vehicle may be a wheel that is currently being used by another, separate vehicle traveling along a route while the first vehicle is being examined in a repair facility. The analysis system may maintain a log, list, table, or other memory structure in the memory device of the parts being currently used by other component subsystems and/or equipment. The characteristics of these parts may be stored in the memory devices as well, and may be obtained from previous inspections of the parts, sensor data provided by the component subsystems and/or equipment, or the like. Similar to the inventory parts, the analysis system may examine the characteristics of the currently used parts to determine if any of the currently used parts may be used as a replacement part. The analysis system also may track locations of the currently used parts, such as by monitoring locations of the vehicles traveling in a network of routes. The locations may be provided by the vehicles, such as by using GPS, transponders disposed along the routes, or the like. The analysis system may provide the current location and/or distance from the component subsystems and/or equipment that include the replacement parts to the user device, so that this information can be provided to the user. The user may then select one or more of these replacement parts, such as by selecting the replacement parts that are available from a local inventory, from another vehicle that is relatively close by, or the like.

The user can select the replacement parts using the user device. This selection can be communicated to the analysis system or another location so that arrangements can be made to provide the selected replacement parts to the user. For example, an order for an inventory part to be obtained and sent to the location of the user may be made by the user device. As another example, instructions may be communicated to another vehicle having a replacement part to divert from the current path or route being traveled to the location of the user device (so that the replacement part can be taken from the other vehicle).

Figure 17:
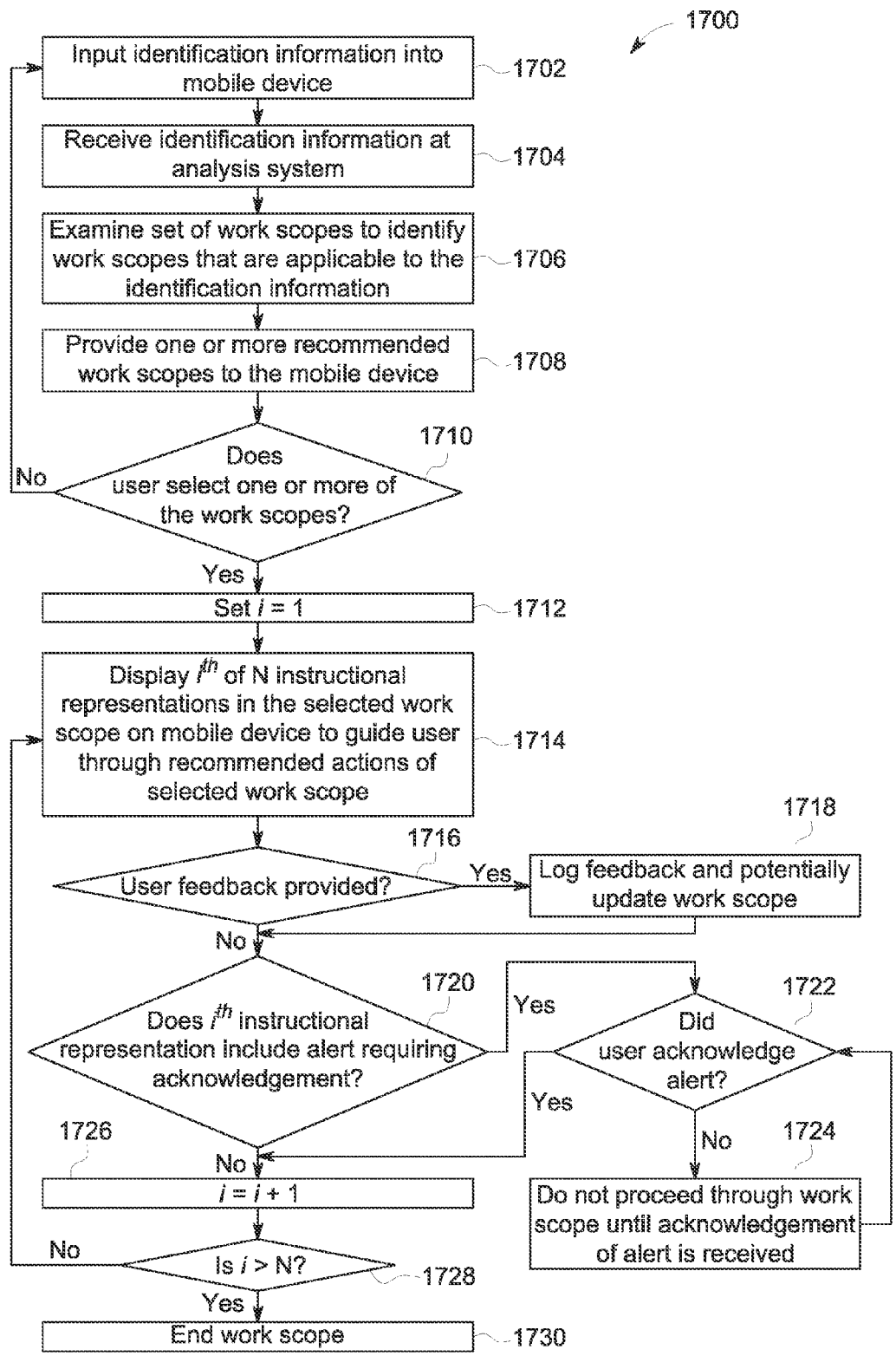
FIG. 17 is a flowchart of an example of a method for remotely supporting users to obtain assistance from one or more remotely located resources to repair, replace, diagnose, and the like, component subsystems of equipment on which the users are working.

FIG. 17 is a flowchart of an example of a method 1700 for remotely supporting users to obtain assistance from one or more remotely located resources to repair, replace, diagnose, and the like, component subsystems of equipment on which the users are working. Operations of the method may be carried out or otherwise performed by the system shown and described herein. For example, one or more of the operations in the method may be performed using the user device while other operations may be performed by the analysis system and/or the resources. Some operations may be carried out by a combination of the user device and the analysis system or resources. In one aspect, the operations described in connection with the method may represent portions of software code that directs operations of one or more components of the system. For example, the flowchart shown in FIG. 17 may be used to create software code that is stored on a tangible and non-transitory computer readable storage medium (e.g., a memory hard drive, flash drive, RAM, ROM, EEPROM, and the like) and that directs the operations of one or more processors to carry out the operations of the method.

At 1702, identification information is input into a mobile device. For example, information that identifies the component subsystem and/or equipment being examined or repaired and/or a potential problem or fault can be input by a user into the user device, as described above. At 1704, the identification information can be communicated to and received by the analysis system. As described above, the user device may be located at or near the component subsystem and/or equipment while the analysis system is located remote from the user device (e.g., not in one or more of the same room, building, town, city, county, or state). Optionally, the identification information may be communicated to the resources.

At 1706, a set of work scopes are examined to identify a smaller subset of work scopes that may be used to resolve (e.g., fix) the problem or fault of the component subsystem and/or equipment. For example, the memory device may store many work scopes that are used for a variety of different problems or faults for a variety of different types of component subsystems and/or equipment. Not all of these work scopes may be useful in examining or repairing the component subsystem and/or equipment being worked on by the user. The identification information provided from the user device can be compared to identification information associated with the different work scopes. Those work scopes in the set having identification information that matches or more closely matches the input identification information than other work scopes may be identified as recommended work scopes. In one aspect, the analysis system may automatically perform this comparison and selection of the work scopes. Optionally, one or more of the resources (e.g., experts and/or technicians) may examine the input identification information and recommend one or more work scopes.

At 1708, one or more of the recommended work scopes are provided to the user via the user device. The work scopes may be presented on the user device for the user to select which of the work scopes to use in the examination and/or repair of the component subsystem and/or equipment. At 1710, a determination is made as to whether the user selected one or more of the recommended work scopes. For example, the user device and/or analysis system can determine whether the user pressed on, "clicked," or otherwise provided input that indicates selection of a work scope.

If the user did not select a recommended work scope, then the user may wish to have another work scope recommended.

For example, the recommended work scope provided to the user may require resources (e.g., tools, equipment, technicians, experts, or the like) that are unavailable to the user, may take too long to complete, may be too expensive to complete, or the like. The method may obtain additional identification information in an attempt to identify another recommended work scope to the user. Optionally, another recommended work scope may be identified using the same identification information that previously was input.

If the user did select a recommended work scope, then flow of the method 1700 may proceed to 1712. At 1712, the value of a variable i is set to one. This variable is an integer number that represents which instructional representation of an action of N total actions in a work scope is being performed or presented to the user. At 1714, the $i^{th}$ recommended action in the work scope is displayed to the user as an instructional representation on the user device. As described above, the actions in the work scope are presented to the user to guide and assist the user through the examination, repair, or the like, of the equipment and/or component subsystem. The user may perform the action, provide feedback based on the action, obtain assistance from one or more resources in performing the action, and the like, as described above.

At 1716, a determination is made as to whether the user has input feedback information about the $i^{th}$ action in the work scope. As described above, the user can input feedback about safety concerns with the action, inefficiencies in the action or work scope, inoperability of the action or work scope, and the like. The user can provide this information to the analysis system via the user device.

If feedback information has been provided, then this information may be recorded and/or used to modify the action and/or work scope in order to improve the action and/or work scope. As a result, flow of the method 1700 can proceed to 1718. Otherwise, if no feedback information has been provided for the current action of the work scope, then flow of the method 1700 may proceed to 1720.

At 1718, the feedback provided by the user via the user device is logged (e.g., stored or otherwise saved or recorded). The feedback can be stored in the memory device 112 and potentially used to update or alter the work scope. For example, upon receiving the feedback, one or more of the resources may alter the action and/or the work scope using the feedback so that the action and/or work scope is safer, more efficient, and/or successful in fixing or otherwise resolving the problem or failure in the component subsystem and/or equipment.

At 1720, a determination is made as to whether the work scope includes an alert requiring acknowledgement by the user in the $i^{th}$ action of the work scope. As described above, the instructional representations in the work scope can include alerts that may require the user to provide input that acknowledges the alert before the work scope can proceed to the next action. If the instructional representation for the $i^{th}$ action of the work scope includes such an alert, then the method 1700 may not advance the work scope to another action until the user provides an acknowledgement of the alert. Consequently, flow of the method 1700 can proceed to 1722. On the other hand, if no such alert is included in the instructional representation of the $i^{th}$ action, or if an alert is provided that does not require any such acknowledgment, the work scope may advance to the next action in the work scope. As a result, flow of the method 1700 may proceed to 1726.

At 1722, a determination is made as to whether the user provided the requisite acknowledgement of the alert. For example, the user device and/or analysis system can examine if the user selected (e.g., touched, "clicked" on, or otherwise activated) an alert icon or other portion of the user interface presented on the user device. If an acknowledgement of the alert is received, then the work scope may proceed and flow of the method 1700 can continue to 1726. If an acknowledgement is not received, then the work scope may be unable to proceed. Flow of the method 1700 can continue to 1724, where the method 1700 waits for receipt of acknowledgement from the user. Once that acknowledgement is received, flow of the method 1700 can continue to 1726.

At 1726, the value of the variable i is increased by a value of one. This increase represents the advancement of the work scope to another action in the work scope. In one aspect, the work scope advances to the next action in a series of actions in the work scope. Optionally, the work scope may proceed to another action, but not necessarily the next action, in the work scope.

At 1728, a determination is made as to whether the work scope has been completed. For example, if the value of i (after being increased at 1726) is greater than the total number of actions in the work scope (e.g., N), then all actions in the work scope may have been completed. As a result, flow of the method 1700 can proceed to 1730, where the work scope terminates. On the other hand, if the value of i is no greater than the total number of actions in the work scope, then additional actions in the work scope may need to be performed before the work scope is completed. As a result, flow of the method 1700 may return to 1714, where another action in the work scope is performed.

In one embodiment, a method (e.g., for remotely supporting users to obtain assistance from one or more remotely located resources to repair, replace, diagnose, and the like, component subsystems of equipment on which the users are working) includes receiving identification information of a potential problem with a remotely located component subsystem of subject equipment from a user located proximate to the subject equipment via a mobile device and responding to receiving the identification information by providing a recommended work scope to the user via the mobile device. The recommended work scope includes a recommended series of actions to perform to at least one of repair or replace the component subsystem and a first instructional representation for display on the mobile device. The first instructional representation both illustrating at least one action of the series of actions to perform and including at least one annotation to represent an alert to the user that is related to the action being illustrated.

The method also can include responding to receiving the identification information by sending a recommended work scope to the user via the mobile device. The first instructional representation also can include a series of images, videos, or a combination of images and videos that are configured to be displayed on the mobile device to guide the user through the recommended work scope. The first instructional representation configured to display one or more of the images, videos, or the combination of images and videos that represent one or more of the actions in the recommended series of actions that correspond to one or more actions actually being performed by the user while the user is performing the one or more actions. One or more operations of this method can be performed by one or more computer processors. For example, hardware circuits or circuitry that includes and/or is connected with one or more microprocessors can perform one or more operations of this method.

In one aspect, the identification information includes at least one of an identification of the user, an identification of a potential problem selection by the user, an identification of the subject equipment being examined by the user, or an identification of the component subsystem of a vehicle system that performs one or more operations of the subject equipment.

In one aspect, the method also includes presenting a different, second instructional representation on the mobile device in response to a user acknowledgement of the alert, and selecting the recommended work scope from plural potential work scopes.

In one aspect, the first and second instructional representations are sequentially displayed and represent a sequence of the series of actions to perform from the recommended work scope. The second instructional representation can be subsequent to the first instructional representation and is only displayed responsive to the user acknowledgement of the alert being received.

In one aspect, the method also can include presenting a menu of plural work scopes that most nearly match the identification information based on a determined set of similarities of the potential problem. The plural work scopes can include the recommended work scope.

In one aspect, the at least one annotation includes an image or video of at least one of the subject equipment or the component subsystem obtained by the user and information of a hazard condition associated with the at least one action.

In one aspect, the method also includes changing a displayed color of a display of one or more parts of the component subsystem that are displayed on the mobile device and associated with the hazard condition responsive to receiving the user acknowledgement of the alert.

In one aspect, the method also can include presenting one or more alert icons or sounds during performance of the recommended work scope that indicate a hazard class associated with the corresponding instructional representation that is displayed on the mobile device.

In one aspect, the method also can include displaying a first viewpoint of an image of at least a portion of the component subsystem on the mobile device in at least one of the instructional representations and, responsive to user control of the mobile device, displaying a different, second viewpoint of the image on the mobile device.

In one aspect, the method also can include displaying plural images of different viewpoints of at least a portion of the component subsystem on the mobile device and allowing a user to select among the viewpoints for display on the mobile device.

In another embodiment, a system (e.g., a services support system) includes an analysis system configured to receive identification information of a potential problem with a remotely located component subsystem of subject equipment from a user located proximate to the subject equipment via a mobile device. The analysis system also is configured to respond to receipt of the identification information by providing a recommended work scope to the user via the mobile device. The recommended work scope includes a recommended series of actions to perform to at least one of repair or replace the component subsystem and a first instructional representation for display on the mobile device. The first instructional representation both illustrates at least one action of the series of actions to perform and includes at least one annotation to represent an alert to the user that is related to the action being illustrated.

The analysis system also is configured to respond to receiving the identification information by sending a recommended work scope to the user via the mobile device. The first instructional representation including a series of images, videos, or a combination of images and videos that are configured to be displayed on the mobile device to guide the user through the recommended work scope. The first instructional representation configured to display one or more of the images, videos, or the combination of images and videos that represent one or more of the actions in the recommended series of actions that correspond to one or more actions actually being performed by the user while the user is performing the one or more actions.

In one aspect, the identification information includes at least one of an identification of the user, an identification of a potential problem selection by the user, an identification of the subject equipment being examined by the user, or an identification of the component subsystem of a vehicle system that performs one or more operations of the subject equipment.

In one aspect, the analysis system is configured to direct the mobile device to present a different, second instructional representation in response to a user acknowledgement of the alert, and to receive a selection of the recommended work scope from among plural potential work scopes via the mobile device.

In one aspect, the analysis system is configured to direct the mobile device to sequentially display the first and second instructional representations in order to represent a sequence of the series of actions to perform from the recommended work scope, and wherein the analysis system is configured to direct the mobile device to display the second instructional representation subsequent to the first instructional representation and only in response to the user acknowledgement of the alert being received from the mobile device.

In one aspect, the analysis system is configured to direct the mobile device to present a menu of plural work scopes that most nearly match the identification information based on a determined set of similarities of the potential problem. The plural work scopes can include the recommended work scope.

In one aspect, the at least one annotation includes an image or video of at least one of the subject equipment or the component subsystem obtained by the user and information of a hazard condition associated with the at least one action.

In another embodiment, a method (e.g., for remotely supporting users) includes determining a difference between a designated characteristic of a first component of a first vehicle system and one or more actual characteristics of the first component, identifying at least one of a replacement component in an inventory stock of components or a currently used component in a second vehicle system responsive to the difference between the designated characteristic and the one or more actual characteristics being outside of a designated range of differences so that the first component of the first vehicle system can be replaced with the replacement component or the currently used component of the second vehicle system, and displaying a notification on a display device of the at least one of the replacement component or the currently used component so that a user of the display device can determine whether to replace the first component with the replacement component or the currently used component.

In one aspect, the first component is a first wheel of the first vehicle system, the currently used component is a second wheel being currently used by the second vehicle system, and the replacement component is a replacement wheel in the inventory stock. The components of the inventory stock can include plural wheels. The method also can include receiving one or more actual dimensions of the first wheel as the one or more actual characteristics. The at least one of the replacement component or the currently used component can be identified responsive to a difference between the one or more actual dimensions of the first wheel and one or more designated dimensions of the first wheel associated with the first vehicle system being outside of the designated range.

In one aspect, the replacement component that is identified has one or more actual characteristics such that a difference between the one or more actual characteristics of the replacement component and the designated characteristic are within the designated range of differences.

In one aspect, the currently used component that is identified is identified only when the second vehicle system is within a designated distance from the first vehicle system and the currently used component has one or more actual characteristics such that a difference between the one or more actual characteristics of the replacement component and the designated characteristic are within the designated range of differences.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method, comprising:
   receiving identification information of a potential problem with a remotely located component subsystem of subject equipment from a user located proximate to the subject equipment via a mobile device;
   responding to receiving the identification information by providing a recommended work scope to the user via the mobile device, the recommended work scope including a recommended series of actions to perform to at least one of repair or replace the component subsystem and a first instructional representation for display on the mobile device, the first instructional representation both illustrating at least one action of the series of actions to perform and including at least one annotation to represent an alert to the user that is related to the action being illustrated, wherein the at least one annotation includes an image or video of at least one of the subject equipment or the component subsystem obtained by the user and information of a hazard condition associated with the at least one action;
   responding to receiving the identification information by sending a recommended work scope to the user via the mobile device, the first instructional representation including a series of images, videos, or a combination of images and videos that are configured to be displayed on the mobile device to guide the user through the recommended work scope, the first instructional representation configured to display one or more of the images, videos, or the combination of images and videos that represent one or more of the actions in the recommended series of actions that correspond to one or more actions actually being performed by the user while the user is performing the one or more actions; and
   changing a displayed color of a display of one or more parts of the component subsystem that are displayed on the mobile device and associated with the hazard condition responsive to receiving a user acknowledgement of the alert.

2. The method of claim 1, wherein the identification information includes at least one of an identification of the user, an identification of a potential problem selection by the user, an identification of the subject equipment being examined by the user, or an identification of the component subsystem of a vehicle system that performs one or more operations of the subject equipment.

3. The method of claim 1, further comprising presenting a different, second instructional representation on the mobile device in response to the user acknowledgement of the alert, and selecting the recommended work scope from plural potential work scopes.

4. The method of claim 3, wherein the first and second instructional representations are sequentially displayed and represent a sequence of the series of actions to perform from the recommended work scope, and wherein the second instructional representation is subsequent to the first instructional representation and is only displayed responsive to the user acknowledgement of the alert being received.

5. The method of claim 1, further comprising presenting a menu of plural work scopes that most nearly match the identification information based on a determined set of similarities of the potential problem, the plural work scopes including the recommended work scope.

6. The method of claim 1, further comprising presenting one or more alert icons or sounds during performance of the recommended work scope that indicate a hazard class associated with the corresponding instructional representation that is displayed on the mobile device.

7. The method of claim 1, further comprising displaying a first viewpoint of an image of at least a portion of the component subsystem on the mobile device in at least one of the instructional representations and, responsive to user control of the mobile device, displaying a different, second viewpoint of the image on the mobile device.

8. The method of claim 1, further comprising displaying plural images of different viewpoints of at least a portion of the component subsystem on the mobile device and allowing a user to select among the viewpoints for display on the mobile device.

9. A services support system comprising:
an analysis system configured to receive identification information of a potential problem with a remotely located component subsystem of subject equipment from a user located proximate to the subject equipment via a mobile device, the analysis system also configured to respond to receipt of the identification information by providing a recommended work scope to the user via the mobile device, the recommended work scope including a recommended series of actions to perform to at least one of repair or replace the component subsystem and a first instructional representation for display on the mobile device,
wherein the analysis system also is configured to respond to receiving the identification information by sending a recommended work scope to the user via the mobile device, the first instructional representation both illustrating at least one action of the series of actions to perform and including at least one annotation to represent an alert to the user that is related to the action being illustrated, the first instructional representation including a series of images, videos, or a combination of images and videos that are configured to be displayed on the mobile device to guide the user through the recommended work scope, the first instructional representation configured to display one or more of the images, videos, or the combination of images and videos that represent one or more of the actions in the recommended series of actions that correspond to one or more actions actually being performed by the user while the user is performing the one or more actions, wherein the at least one annotation includes an image or video of at least one of the subject equipment or the component subsystem obtained by the user and information of a hazard condition associated with the at least one action, and wherein the analysis system is configured to direct the mobile device to change a displayed color of a display of one or more parts of the component subsystem that are displayed on the mobile device and associated with the hazard condition responsive to receiving a user acknowledgement of the alert.

10. The services support system of claim 9, wherein the identification information includes at least one of an identification of the user, an identification of a potential problem selection by the user, an identification of the subject equipment being examined by the user, or an identification of the component subsystem of a vehicle system that performs one or more operations of the subject equipment.

11. The services support system of claim 9, wherein the analysis system is configured to direct the mobile device to present a different, second instructional representation in response to the user acknowledgement of the alert, and to receive a selection of the recommended work scope from among plural potential work scopes via the mobile device.

12. The services support system of claim 11, wherein the analysis system is configured to direct the mobile device to sequentially display the first and second instructional representations in order to represent a sequence of the series of actions to perform from the recommended work scope, and wherein the analysis system is configured to direct the mobile device to display the second instructional representation subsequent to the first instructional representation and only in response to the user acknowledgement of the alert being received from the mobile device.

13. The services support system of claim 9, wherein the analysis system is configured to direct the mobile device to present a menu of plural work scopes that most nearly match the identification information based on a determined set of similarities of the potential problem, the plural work scopes including the recommended work scope.

14. The services support system of claim 9, wherein the at least one annotation includes an image or video of at least one of the subject equipment or the component subsystem obtained by the user and information of a hazard condition associated with the at least one action.

15. A method, comprising:
determining a difference between a designated characteristic of a first component of a first vehicle system and one or more actual characteristics of the first component;
identifying at least one of a replacement component in an inventory stock of components or a currently used component in a second vehicle system responsive to the difference between the designated characteristic and the one or more actual characteristics being outside of a designated range of differences so that the first component of the first vehicle system can be replaced with the replacement component or the currently used component of the second vehicle system, wherein the currently used component that is identified is identified only when the second vehicle system is within a designated distance from the first vehicle system and the currently used component has one or more actual characteristics such that a difference between the one or more actual characteristics of the replacement component and the designated characteristic are within the designated range of differences; and
displaying a notification on a display device of the at least one of the replacement component or the currently used component so that a user of the display device can determine whether to replace the first component with the replacement component or the currently used component.

16. The method of claim 15, wherein the first component is a first wheel of the first vehicle system, the currently used component is a second wheel being currently used by the second vehicle system, and the replacement component is a replacement wheel in the inventory stock, the components of the inventory stock comprising plural wheels, and further comprising receiving one or more actual dimensions of the first wheel as the one or more actual characteristics, wherein the at least one of the replacement component or the currently used component is identified responsive to a difference between the one or more actual dimensions of the first wheel and one or more designated dimensions of the first wheel associated with the first vehicle system being outside of the designated range.

17. The method of claim 15, wherein the replacement component that is identified has one or more actual characteristics such that a difference between the one or more actual characteristics of the replacement component and the designated characteristic are within the designated range of differences.

\* \* \* \* \*